(12) United States Patent
Shimizu et al.

(10) Patent No.: US 6,483,442 B2
(45) Date of Patent: Nov. 19, 2002

(54) PARKING AID SYSTEM

(75) Inventors: Yasuo Shimizu, Wako (JP); Yasuharu Ohyama, Wako (JP); Katsuhiro Sakai, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/905,072

(22) Filed: Jul. 16, 2001

(65) Prior Publication Data

US 2002/0041239 A1 Apr. 11, 2002

(30) Foreign Application Priority Data

Jul. 27, 2000 (JP) .......................... 2000-227266

(51) Int. Cl.$^7$ ................................ G08G 1/00
(52) U.S. Cl. .................. 340/932.2; 340/903; 340/436; 340/549; 340/901; 340/937; 180/204; 180/446
(58) Field of Search ............... 340/932.2, 903, 340/436, 549, 901, 937; 180/204, 446

(56) References Cited

U.S. PATENT DOCUMENTS 5,742,141 A * 4/1998 Czekaj ........................ 318/587
5,931,253 A * 8/1999 Shimizu et al. .............. 180/204
6,218,960 B1 * 4/2001 Ishikawa et al. ............ 340/901

FOREIGN PATENT DOCUMENTS

JP       11-157404       6/1999       ........... B60R/21/00

* cited by examiner

Primary Examiner—Daniel J. Wu
Assistant Examiner—Tai T. Nguyen
(74) Attorney, Agent, or Firm—Arent Fox Kintner Plotkin & Kahn, PLLC

(57) ABSTRACT

A parking aid system having a driver initially stop the subject vehicle alongside a target parking position so that a mark provided inside a door coincides with the central line of the target parking position when assisting the driver with left reverse parking. The subject vehicle is a predetermined distance away from an entrance of the target parking position, when the driver turns the operation switch ON. A display unit then displays the target parking position, the subject vehicle position, and an expected parking position. The expected parking position is set at a position that the subject vehicle reaches when reversing with the steering wheel turned fully to the left. Therefore, when the driver moves the subject vehicle forward to a position where the expected parking position coincides with the target parking position and reverses the subject vehicle from that position through 90° while turning the steering wheel fully to the left, the subject vehicle can reliably be guided to the target parking position.

29 Claims, 35 Drawing Sheets

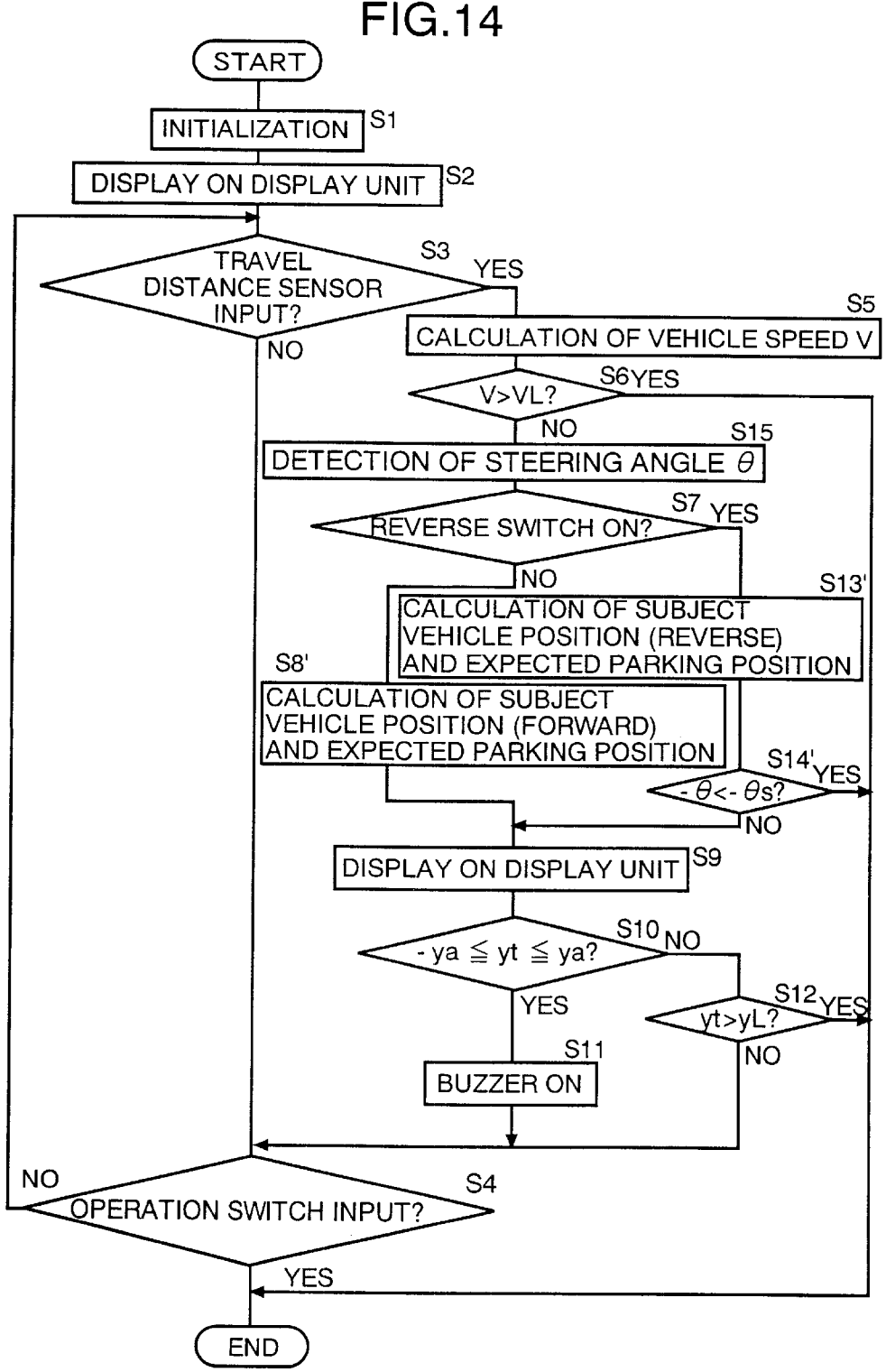

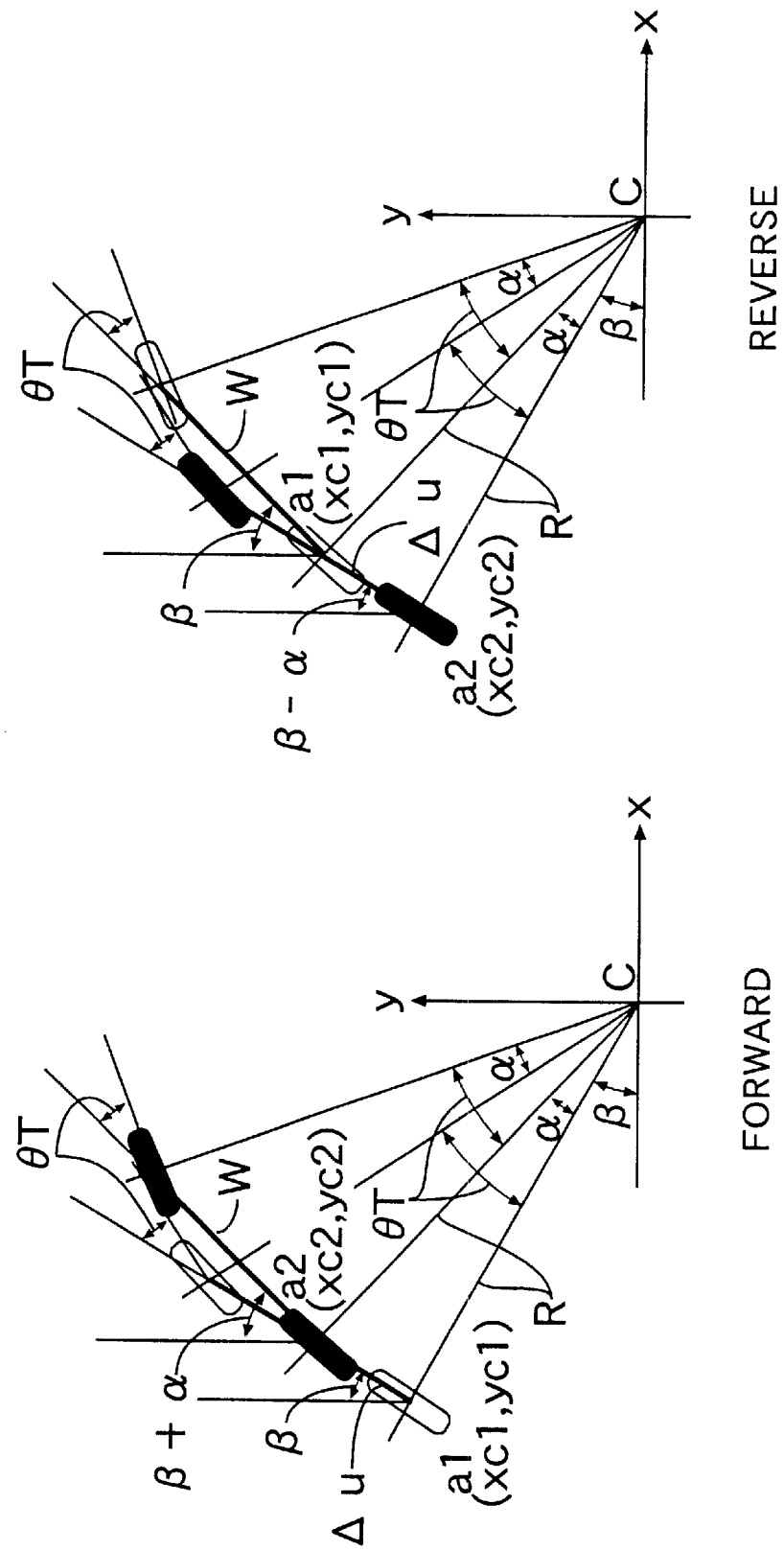

PARKING AID SYSTEM

BACKGROUND OF THE INVENTION

1. Field of the Invention

The present invention relates to a parking aid system for aiding a driver in carrying out reverse parking or parallel parking.

2. Description of the Related Art

A conventional parking aid system is disclosed in Japanese Patent Application Laid-open No. 11-157404 that identifies a parking space according to surrounding obstructions which are detected by, for example, a camera, radar or corner sensor. The parking aid system then calculates a recommended trajectory or locus from the current position of the vehicle to the above-mentioned parking space. The recommended trajectory is displayed over a parking space image on a display unit so as to direct the driver to, for example, steer, brake, accelerate or shift gear, and thus parking is assisted.

However, the above-mentioned conventional parking aid system requires not only various types of sensors such as cameras, radars and corner sensors for identifying a parking space, but also requires a high performance arithmetic unit for calculating the recommended trajectory from the current vehicle position to the parking space and the driving operations required to move the vehicle along the recommended trajectory. Thus, the conventional parking aid system suffers from high costs and the time required for parking is undesirably long due to a long calculation time performed by the arithmetic unit. Furthermore, if the driving operations required to move the vehicle along the recommended trajectory become complicated, the driver cannot instinctively tell whether or not the vehicle can be moved to the parking space by those operations and may feel anxious. Moreover, in using the conventional parking aid system, the driver ends up paying too much attention to the operational instructions and less attention to the surroundings of the vehicle.

SUMMARY OF THE INVENTION

Therefore, it is an object of the present invention to provide a parking aid system that overcomes the above-described drawbacks of the conventional parking aid system.

It is also an object of the present invention to provide a parking aid system that can effectively aid a driver in a parking operation by having a simple structural arrangement.

In accordance with a first characteristic of the present invention, the parking aid system includes a display unit to visually display to a driver a target parking position, a subject vehicle position, an expected parking position in the case where the subject vehicle travels with a predetermined steering angle, and an operation switch for selecting a parking aid mode. The display unit displays when the parking aid mode is selected by the operation switch, the target parking position, the subject vehicle position, and the expected parking position, as well as a change in at least one of the subject vehicle position, and the expected parking position, relative to the target parking position according to a change in at least one of the movement of the subject vehicle and the steering angle.

In accordance with the above-mentioned arrangement, when the parking aid mode is selected, the display unit displays not only the target parking position, the subject vehicle position, and the expected parking position, but also a change in the subject vehicle position or the expected parking position relative to the target parking position accompanying the subject vehicle movement or the steering operation. The driver can thus proceed based on the above-mentioned information so that the expected parking position coincides with the target parking position, and confirm on the display unit that the subject vehicle can be moved to the target parking position by the driver's operation. The driver can thus guide the subject vehicle easily and reliably to the target parking position without feeling anxious. Furthermore, since there is no need for an image processing device for detecting the target parking position or need for calculation of the driver's operations required for moving the subject vehicle along an expected trajectory, the parking aid system can be realized with very low cost.

Furthermore, in accordance with a second characteristic of the present invention, the display unit also visually displays to the driver an expected trajectory when the subject vehicle travels with a predetermined steering angle as well as a change in the expected trajectory relative to the target parking position according to a change in at least one of the subject vehicle movement and the steering angle.

In accordance with the above-mentioned arrangement, the display unit displays not only the expected trajectory of the subject vehicle, but also a change in the expected trajectory of the subject vehicle relative to the target parking position accompanying movement of the subject vehicle or operation of the steering. The driver can therefore proceed based on the above-mentioned information so that the expected parking position coincides with the target parking position and guide the subject vehicle to the target parking position more accurately.

Furthermore, in accordance with a third characteristic of the present invention, the predetermined steering angle is a maximum steering angle either to the right or the left.

In accordance with the above-mentioned arrangement, since the expected trajectory and the expected parking position when the subject vehicle travels towards the target parking position are determined by estimating the maximum steering angle to the right or the left, the driver can guide the subject vehicle to the target parking position merely by holding the steering wheel at the maximum steering angle position. Thus, the driver's operation becomes simple, the driver does not feel anxious, and, the driver is able to pay attention to the subject vehicle surroundings.

Furthermore, in accordance with a fourth characteristic of the present invention, the parking aid system further includes first determination means for determining the occurrence of the expected parking position coinciding with the target parking position, a predetermined amount of time that passed in the coincident state, and the time immediately before the coincidence of positions based on a change in at least one of the subject vehicle movement and the steering angle.

In accordance with the above-mentioned arrangement, since the occurrence of any of the events of the expected parking position coinciding with the target parking position, a predetermined amount of time passing in the coincident state, and the time immediately before the coincidence of positions is determined based on a change in the subject vehicle movement or the steering angle, the driver can easily determine whether the subject vehicle can move to the target parking position and thus reliably recognize the timing for starting to reverse the subject vehicle towards the target parking position without feeling anxious.

Furthermore, in accordance with a fifth characteristic of the present invention, the parking aid system further includes notifying means for notifying the driver when the first determination means has determined the occurrence of any of the events of the expected parking position coinciding with the target parking position, a predetermined time having passed in the coincident state, and the time immediately before the coincidence of positions.

In accordance with the above-mentioned arrangement, since the notifying means notifies the driver the occurrence of any of the events of the expected parking position coinciding with the target parking position, a predetermined time having passed in the coincident state, and the time immediately before the coincidence of positions, the driver can easily determine whether or not the subject vehicle can move to the target parking position and thus more reliably recognize the timing for starting to reverse the subject vehicle towards the target parking position without feeling anxious.

Furthermore, in accordance with a sixth characteristic of the present invention, the notifying means notifies the driver using sound.

In accordance with the above-mentioned arrangement, since the notifying means notifies the driver using sound, even when looking away from the display unit, the driver would not fail to notice the determination made by the first determination means, can use the parking aid system appropriately and, can pay sufficient attention to the subject vehicle surroundings.

Furthermore, in accordance with a seventh characteristic of the present invention, the notifying means notifies the driver by changing the displayed form of at least one of the target parking position, the subject vehicle position, the expected trajectory, and the expected parking position displayed on the display unit.

In accordance with the above-mentioned arrangement, since the notifying means notifies the driver by changing the displayed form on the display unit, the driver looking at the display unit can be alerted to reliably recognize the notified content and the parking aid system can thus be used appropriately.

Furthermore, in accordance with an eighth characteristic of the present invention, the displayed form is a color or line.

In accordance with the above-mentioned arrangement, since the displayed form is changed by changing the color or line of the display, the driver can easily recognize the notified content by looking at the color or line of the display.

Furthermore, in accordance with a ninth characteristic of the present invention, the notifying means notifies the driver by displaying, on the display unit, a character string indicating the occurrence of any of the events of the expected parking position coinciding with the target parking position, a predetermined time having passed in the coincident state, and the time immediately before the coincidence of positions.

In accordance with the above-mentioned arrangement, since the notification is carried out by displaying a character string on the display when the expected parking position coincides with the target parking position, a predetermined time has passed in the coincident state, or the time is immediately before the coincidence of positions, the driver can easily and reliably recognize the notified content.

Furthermore, in accordance with a tenth characteristic of the present invention, the parking aid system further includes a back monitor for taking an image of the area behind the subject vehicle, wherein the notifying means notifies the driver by displaying the image taken by the back monitor on the display unit.

In accordance with the above-mentioned arrangement, since the notification is carried out by displaying an image of the area behind the subject vehicle taken by the back monitor on the display unit, the driver can easily and reliably recognize the notified content and comprehend the conditions behind the subject vehicle prior to a subsequent reversing action.

Furthermore, in accordance with an eleventh characteristic of the present invention, the notification by the notifying means is carried out for a predetermined time.

In accordance with the above-mentioned arrangement, since the notification by the notifying means is carried out only for the predetermined time, the driver will not be disturbed while using the parking aid system.

It should be noted here that the above-mentioned predetermined time is set at 1 second in the below described embodiments, but the present invention is not limited thereby.

Furthermore, in accordance with a twelfth characteristic of the present invention, the parking aid system further includes a mark that is used when stopping the subject vehicle so that the target parking position and the subject vehicle position have a predetermined positional relationship when selecting the parking aid mode with the operation switch.

In accordance with the above-mentioned arrangement, since the parking aid system includes a mark that is used when stopping the subject vehicle before starting the parking assistance, the driver can easily stop the subject vehicle so that the target parking position and the subject vehicle position have a predetermined positional relationship. It is therefore possible to prevent the driver from worrying about the predetermined positional relationship being established and repeatedly adjusting the stop position of the subject vehicle due to difficulty in determining whether the predetermined positional relationship has been established.

Furthermore, in accordance with a thirteenth characteristic of the present invention, the parking aid system further includes first cancellation means for canceling the parking aid mode when the difference between the target parking position and the expected parking position exceeds a predetermined value.

In accordance with the above-mentioned arrangement, since the first cancellation means cancels the parking aid mode when the difference between the target parking position and the expected parking position exceeds a predetermined value, it is possible to prevent the parking operation from being started at an inappropriate position, thereby enhancing the reliability of the parking aid system.

It should be noted here that the above-mentioned predetermined value is set at 1 meter in the embodiments, but the present invention is not limited thereby.

Furthermore, in accordance with a fourteenth characteristic of the present invention, the parking aid system further includes second determination means for determining whether the subject vehicle position coincides with a predetermined position on the trajectory to the target parking position that the operational state of the subject vehicle is changed.

In accordance with the above-mentioned arrangement, when the subject vehicle position coincides with a predetermined position on the trajectory to the target parking position that the operational state of the subject vehicle is changed, the second determination means determines that the above-mentioned coincidence of positions has occurred. It is therefore possible to prompt the driver to change the operational state of the subject vehicle at the above-mentioned predetermined position. The driver can thus use the parking aid system appropriately and the reliability of the parking aid system can be enhanced.

Furthermore, in accordance with a fifteenth characteristic of the present invention, the parking aid system further includes notifying means for notifying the driver when the second determination means determines the occurrence of any of the events of the subject vehicle position coinciding with the above-mentioned predetermined position, a predetermined time having passed in the coincident state, and the time immediately before the coincidence of positions.

In accordance with the above-mentioned arrangement, the notifying means notifies the driver when the subject vehicle position has coincided with the predetermined position on the trajectory to the target parking position that the operational state of the subject vehicle is changed, a predetermined time has passed in the coincident state, or the time is immediately before the coincidence of positions. The driver can therefore recognize the timing for changing the operational state of the subject vehicle more reliably and use the parking aid system appropriately without feeling anxious, and the reliability of the parking aid system can be enhanced.

Furthermore, in accordance with a sixteenth characteristic of the present invention, the notifying means notifies the driver using sound.

In accordance with the above-mentioned arrangement, since the notifying means notifies the driver using sound, even when the driver is looking away from the display unit, the driver will not fail to recognize the timing for changing the operational state of the subject vehicle and can use the parking aid system appropriately, the reliability of the parking aid system is enhanced and, the driver is able to pay attention to the subject vehicle surroundings.

Furthermore, in accordance with a seventeenth characteristic of the present invention, the notifying means notifies the driver by changing the displayed form of at least one of the target parking position, the subject vehicle position, the expected trajectory, and the expected parking position displayed on the display unit.

In accordance with the above-mentioned arrangement, since the notifying means notifies the driver by changing the displayed form on the display unit, the driver looking at the display unit is alerted so as to reliably recognize the content of the notification and use the parking aid system appropriately, thereby enhancing the reliability of the parking aid system.

Furthermore, in accordance with an eighteenth characteristic of the present invention, the displayed form is a color or line.

In accordance with the above-mentioned arrangement, since the displayed form is changed by changing the color or line of the display, the driver can easily recognize the notified content by looking at the color or line of the display and use the parking aid system appropriately and, moreover, the reliability of the parking aid system is enhanced.

Furthermore, in accordance with a nineteenth characteristic of the present invention, the notifying means notifies the driver by displaying on the display unit a character string indicating the occurrence of any of the events of the subject vehicle position coinciding with the predetermined position, a predetermined time having passed in the coincident state, and the time immediately before the coincidence of positions.

In accordance with the above-mentioned arrangement, since the notification is carried out by displaying a character string when the subject vehicle position has coincided with a predetermined position, a predetermined time has passed in the coincident state or the time is immediately before the coincidence of positions, the driver can easily and reliably recognize the notified content.

Furthermore, in accordance with a twentieth characteristic of the present invention, the parking aid system further includes a back monitor for taking an image of the area behind the subject vehicle, the notifying means notifying the driver by displaying the image taken by the back monitor on the display unit.

In accordance with the above-mentioned arrangement, since the notification is carried out by displaying an image of the area behind the subject vehicle taken by the back monitor on the display unit, the driver can easily and reliably recognize the notified content and, moreover, the driver can comprehend the conditions behind the subject vehicle prior to a subsequent reversing action.

Furthermore, in accordance with a twenty-first characteristic of the present invention, notification by the notifying means is carried out for a predetermined time.

In accordance with the above-mentioned arrangement, since the notification by the notifying means is carried out merely for the predetermined time, the driver will not be disturbed while using the parking aid system.

It should be noted here that the above-mentioned predetermined time is set at 1 second in the embodiments, but the present invention is not limited thereby.

Furthermore, in accordance with a twenty-second characteristic of the present invention, the display unit displays an expected trajectory according to the predetermined steering angle before the second determination means determines the occurrence of any of the events of the subject vehicle position coinciding with the above-mentioned predetermined position, a predetermined time having passed in the coincident state and the time immediately before the coincidence of positions, and displays an expected trajectory according to the actual steering angle after the determination.

In accordance with the above-mentioned arrangement, since the display unit displays an expected trajectory according to the actual steering angle after the determination by the second determination means, even when the subject vehicle has passed the predetermined position, the driver can adjust the steering angle to make the expected parking position coincide with the target parking position. The driver may therefore stop the subject vehicle at approximately the predetermined position thus improving the ease of use of the parking aid system. It is also possible to prevent use of the parking aid system at an inappropriate position, thereby enhancing the reliability of the parking aid system.

Furthermore, in accordance with a twenty-third characteristic of the present invention, the change in operational state of the subject vehicle is the switch-over between forward and backward travel.

In accordance with the above-mentioned arrangement, even when the subject vehicle has passed the position at which it should have switched over between forward and backward travel during reverse parking, the driver can adjust the steering angle to make the expected parking position coincide with the target parking position. The driver may therefore stop the subject vehicle at approximately the predetermined position, thus improving the ease of use of the parking aid system. It is also possible to prevent use of the parking aid system at an inappropriate position, thereby enhancing the reliability of the parking aid system.

Furthermore, in accordance with a twenty-fourth characteristic of the present invention, the change in operational state of the subject vehicle is a steering operation in an opposite direction.

In accordance with the above-mentioned arrangement, even when the subject vehicle has passed the position at which the steering wheel should have been turned in the opposite direction during parallel parking, the driver can adjust the steering angle to make the expected parking position coincide with the target parking position.

Furthermore, in accordance with a twenty-fifth characteristic of the present invention, the parking aid system further includes third determination means for determining that the subject vehicle position has coincided with the target parking position.

In accordance with the above-mentioned arrangement, since it is determined that the subject vehicle position has coincided with the target parking position, it is possible to prevent the subject vehicle from passing beyond the target parking position and the driver can easily move the subject vehicle to the target position without feeling anxious.

Furthermore, in accordance with a twenty-sixth characteristic of the present invention, the parking aid system further includes a back monitor for taking an image in the direction in which the subject vehicle is being parked, the image taken by the back monitor being displayed on the display unit when the third determination means determines that the subject vehicle position has coincided with the target parking position.

In accordance with the above-mentioned arrangement, when it is determined that the subject vehicle position has coincided with the target parking position, the display unit displays the image of the area behind the subject vehicle taken by the back monitor. The driver can therefore confirm that the parking operation has been proceeding correctly and the reliability of the parking aid system is enhanced.

Furthermore, in accordance with a twenty-seventh characteristic of the present invention, the parking aid system further includes reverse determination means for determining that the subject vehicle is in a reverse mode, the display on the display unit is being changed when the reverse determination means determines that the subject vehicle is in the reverse mode.

In accordance with the above-mentioned arrangement, since the display on the display unit is changed when it is determined that the subject vehicle is in the reverse mode, it is possible to prevent the driver from paying too much attention to the display on the display unit and less attention to the surrounding conditions.

It should be noted here that the reverse switch in the embodiments corresponds to the reverse determination means of the present invention. The reverse determination means detects a state in which the subject vehicle is actually reversing or a state in which the subject vehicle is stopped with reverse range selected.

Furthermore, in accordance with a twenty-eighth characteristic of the present invention, the parking aid system further includes a back monitor for taking an image of the area behind the subject vehicle, the image taken by the back monitor is displayed on the display unit when the reverse determination means determines that the subject vehicle is in the reverse mode.

In accordance with the above-mentioned arrangement, when it is determined that the subject vehicle is in the reverse mode, the image taken by the back monitor is displayed on the display unit. The driver can therefore check the subject vehicle surroundings well, in particular the area behind the subject vehicle, which is the direction of travel. The driver can further confirm that the parking operation is being carried out correctly and the reliability of the parking aid system is enhanced.

Furthermore, in accordance with a twenty-ninth characteristic of the present invention, the parking aid system further includes second cancellation means for canceling the parking aid mode when the speed of travel of the subject vehicle reaches or exceeds a predetermined value.

In accordance with the above-mentioned arrangement, since the parking aid mode is cancelled when the speed of travel of the subject vehicle reaches or exceeds the predetermined value, it is possible to prevent the expected parking position from being displaced from the target parking position due to wheel slip, thereby enhancing the reliability of the parking aid system.

It should be noted here that the above-mentioned predetermined value is set at 10 km/h in the embodiments, but the present invention is not limited thereby.

The above-mentioned objectives, other objectives, characteristics and advantages of the present invention will become apparent from an explanation of preferable embodiments that will be described in detail below by reference to the attached drawings.

BRIEF DESCRIPTION OF THE DRAWINGS

FIG. 14 is a flow chart for explaining the action of left reverse parking;

FIGS. 16A and 16B are diagrams explaining the relationship between the distance traveled and the inclination of a vehicle;

DESCRIPTION OF PREFERRED EMBODIMENTS

The first embodiment of the present invention is explained below with reference to FIGS. 1 to 11.

Figure 1:
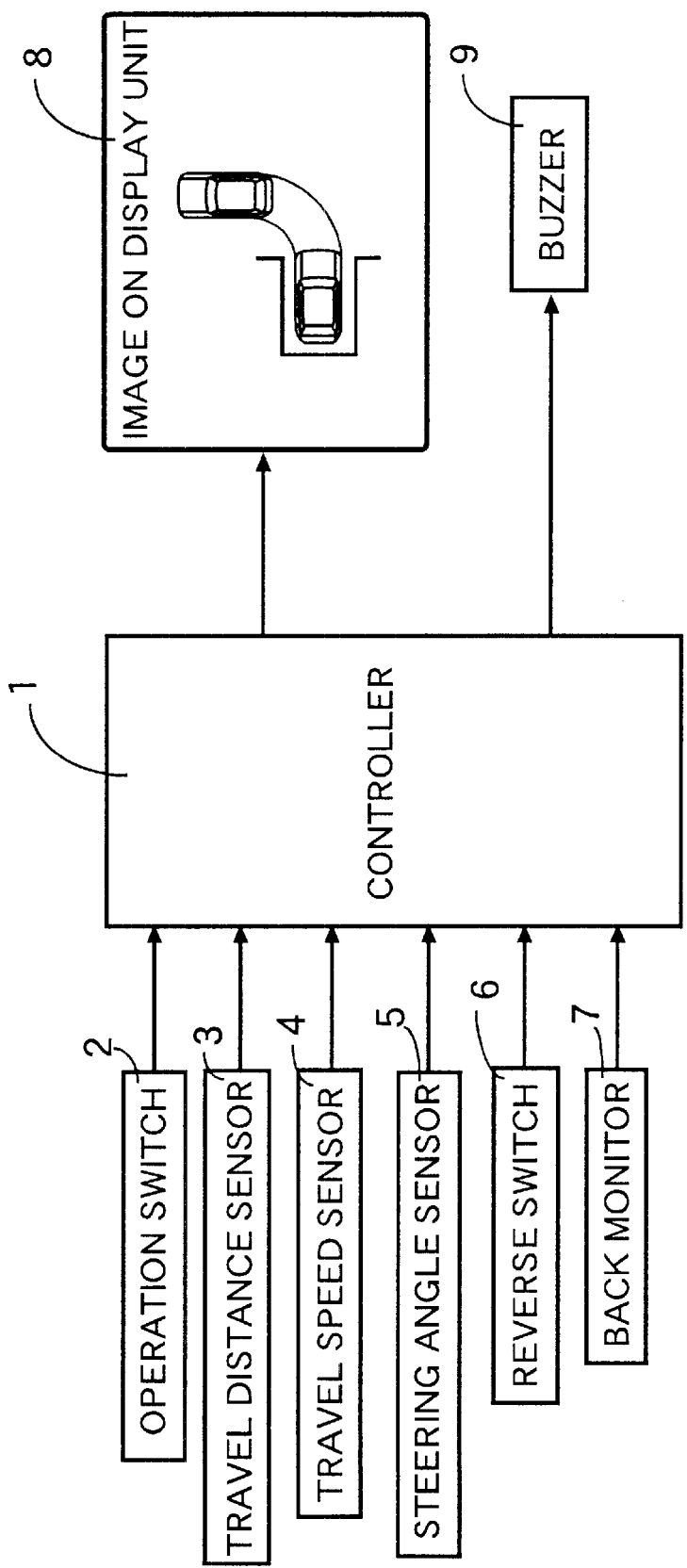
FIG. 1 is a block diagram showing the overall arrangement of a parking aid system, according to a first embodiment of the invention.

As shown in FIG. 1, a parking aid system mounted in a four wheel vehicle has a controller 1 including a microcomputer. An operation switch 2, a travel distance sensor 3, a travel speed sensor 4, a steering angle sensor 5, a reverse switch 6, a back monitor 7, a display unit 8, and a buzzer 9 are connected to the controller 1.

The operation switch 2 comprises a power switch, with which a driver switches on/off the power to the parking aid system, and a parking mode selection switch. The parking mode selection switch selects from three parking modes, that is 'left reverse parking mode', 'right reverse parking mode' and 'left parallel parking mode'. The parking mode selection switch is either formed from three switches so as to correspond to the three parking modes or is formed from one switch so that the three parking modes are switched in turn by pressing the one switch. Alternatively, the operation switch 2 may be formed so that one switch operates both the on/off power to the parking aid system as well as the parking mode selection. The travel distance sensor 3 calculates the distance traveled by the vehicle based on a pulse signal output accompanying rotation of the wheels. The travel speed sensor 4 calculates the vehicle travel speed by differentiating the distance traveled as detected by the travel distance sensor 3 with time. The steering angle sensor 5 detects the angle of the steering wheel steered by the driver. The reverse switch 6 detects operation of the select lever to reverse range by the driver so as to reverse the vehicle. The back monitor 7 is formed from a camera, such as, for example only, a television camera, mounted on the rear part of the vehicle and takes an image of the area behind the vehicle.

The display unit 8 is formed from, for example, a liquid crystal panel, which the driver can recognize visually. The display unit 8 can be shared with a navigation system or a vehicle-mounted television. The display unit 8 shows various types of information to aid the driver during a parking operation. The buzzer 9 is provided in order to alert the driver of a notification using sound.

Figure 2:
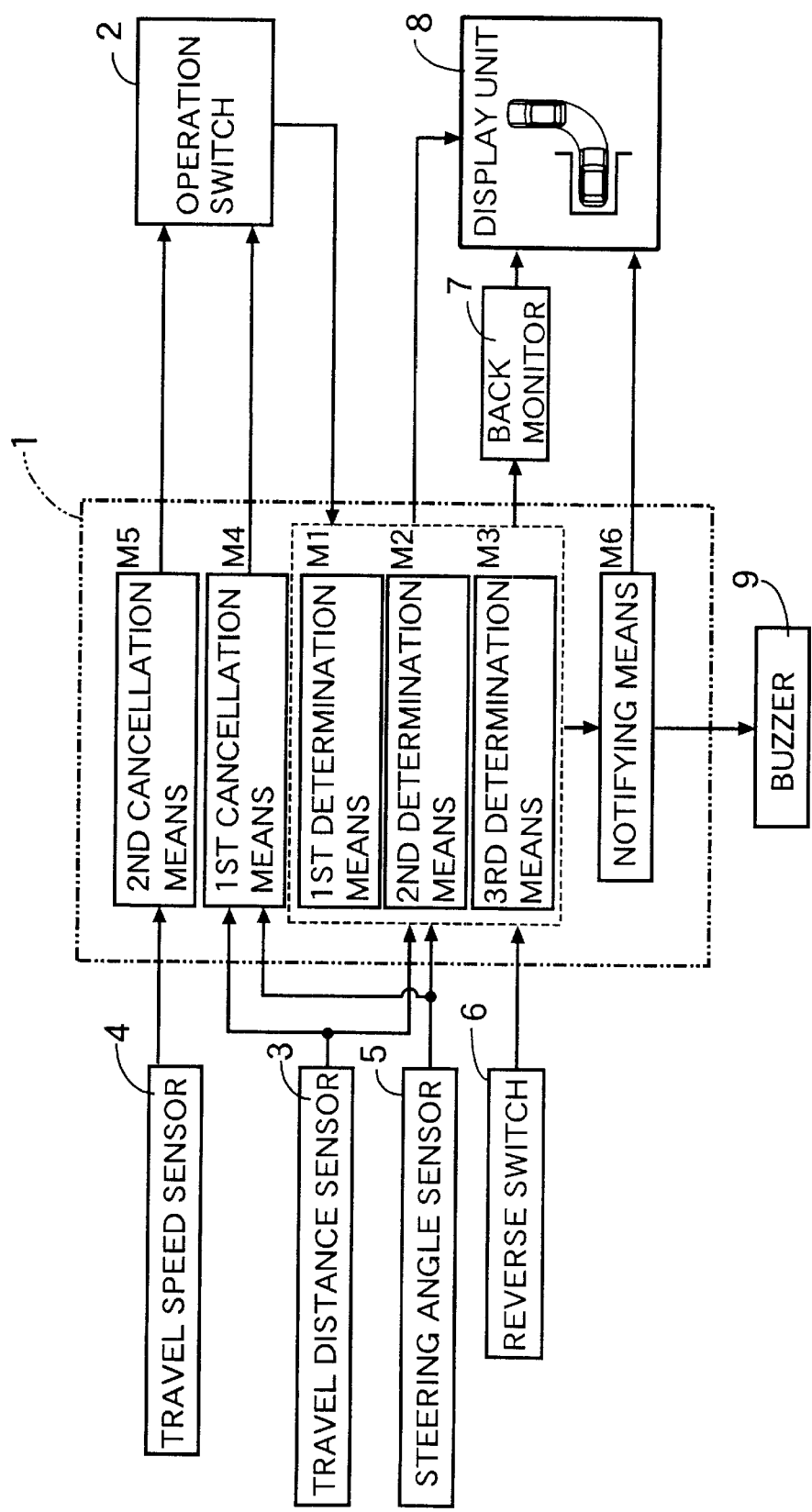
FIG. 2 is a block diagram showing a controller circuit.
Figure 3:
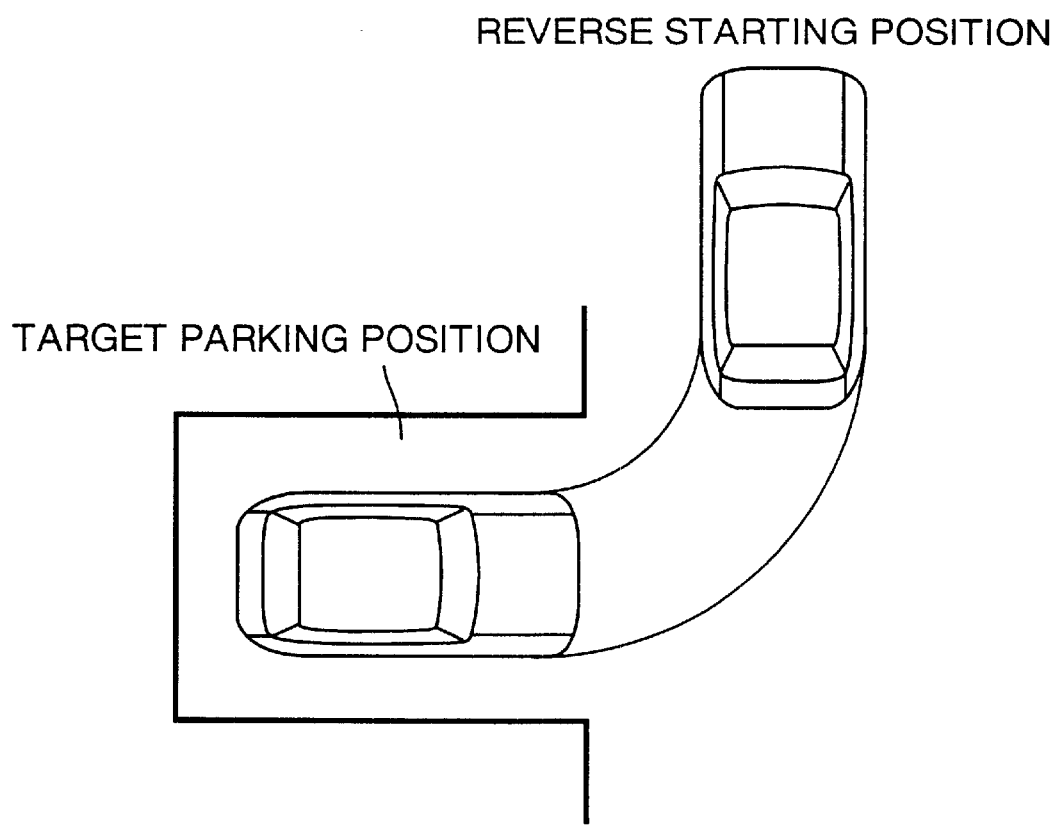
FIG. 3 is a diagram for explaining left reverse parking.

As shown in FIG. 2, the controller 1 comprises first determination means M1, second determination means M2, third determination means M3, first cancellation means M4, second cancellation means M5 and notifying means M6. The first to third determination means M1 to M3 display a target parking position, a subject vehicle position, an expected trajectory and an expected parking position, which are explained below, on the display unit 8 based on the distance traveled by the subject vehicle detected by the travel distance sensor 3, the steering angle detected by the steering angle sensor 5, and the direction of travel of the subject vehicle detected by the reverse switch 6. The image of the area behind the subject vehicle taken by the back monitor 7 is also displayed on the display unit 8.

The function of the first determination means M1 is the same as that of the second determination means M2 at the reverse starting positions in all embodiments of the present invention. The reason is that although the first determination means M1 determines that the expected parking position coincides with the target parking position and the second determination means M2 determines the position where the subject vehicle changes its direction of travel from forward to backward, the above-mentioned two determinations are carried out simultaneously at the reverse starting positions.

The function of the second determination means M2 is the same as that of the third determination means M3 at the switch over position in the yet to be described fourth embodiment. The reason is that although the second determination means M2 determines the position at which the steering angle changes from left to right and the third determination means M3 determines that the subject vehicle position has coincided with the target parking position, the above-mentioned two determinations are carried out simultaneously at the switch over position of the fourth embodiment. In addition, when the left parallel parking is split into a first half comprising left reverse parking and a second half comprising right reverse parking, since the switch over position corresponds to the target parking position of the left reverse parking, determination by the third determination means M3 that the subject vehicle position has coincided with the switch over position is the same as determination that the subject vehicle position has coincided with the target parking position.

The second cancellation means M5 cancels the parking assistance en route by operating the operating switch 2 based on the speed of travel of the subject vehicle detected by the travel speed sensor 4. The first cancellation means M4 cancels the parking aid en route by operating the operating switch 2 based on the distance traveled by the subject vehicle detected by the travel distance sensor 3 and the steering angle detected by the steering angle sensor 5. The notifying means M6 operates the buzzer 9 based on the signals from the first and second determination means M1 and M2 and notifies the driver by changing the display on the display unit 8. The functions of the above-mentioned respective means M1 to M6 are explained in further detail below.

The first embodiment of the present invention is now explained by reference to a case (FIG. 3) where left reverse parking is assisted, in which a subject vehicle travels backward from a reverse starting position and leftward to a target parking position.

Figure 4:
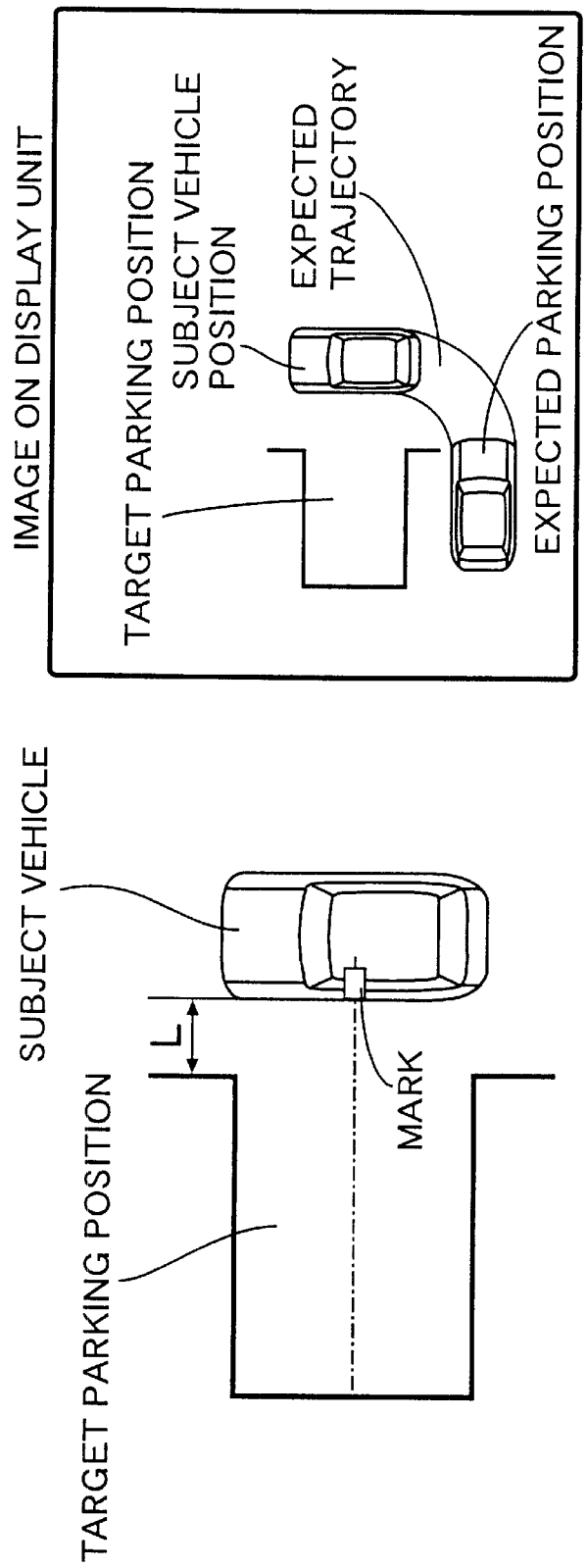
FIG. 4 is a diagram showing a state in which a subject vehicle is at a start position.

First, as shown in FIG. 4, the driver stops the subject vehicle at a start position near the entrance of the target parking position, which is a parking space. The start position is a position at which the left-hand side of the subject vehicle is a predetermined distance L, for example, 1 meter, from the entrance of the target parking position. The subject vehicle is perpendicular to the central line of the target parking position and a mark provided on the subject vehicle coincides with the center, i.e., on the central line, of the entrance of the target parking position. The mark may be provided, for example, inside the door, or a door mirror, or the like, may be used as the mark. When the driver selects a left reverse parking mode by operating the operating switch 2 at this point, the display unit 8 displays the target parking position, the subject vehicle position, an expected trajectory from the subject vehicle position, and an expected parking position when following the expected trajectory. The expected trajectory and the expected parking position in this case are determined under conditions where the subject vehicle is turned through 90° while traveling backward with the steering angle set at the maximum to the left.

In FIG. 4, if the actual subject vehicle position were displaced from the correct start position, since the subject vehicle position on the display unit 8 is displayed at the correct start position, the actual subject vehicle position would not coincide with the subject vehicle position on the display unit 8 and the subsequent parking assistance would not be carried out appropriately. In order to achieve appropriate parking assistance, it is necessary for the driver to stop the subject vehicle at the correct start position shown in FIG. 4.

Figure 5:
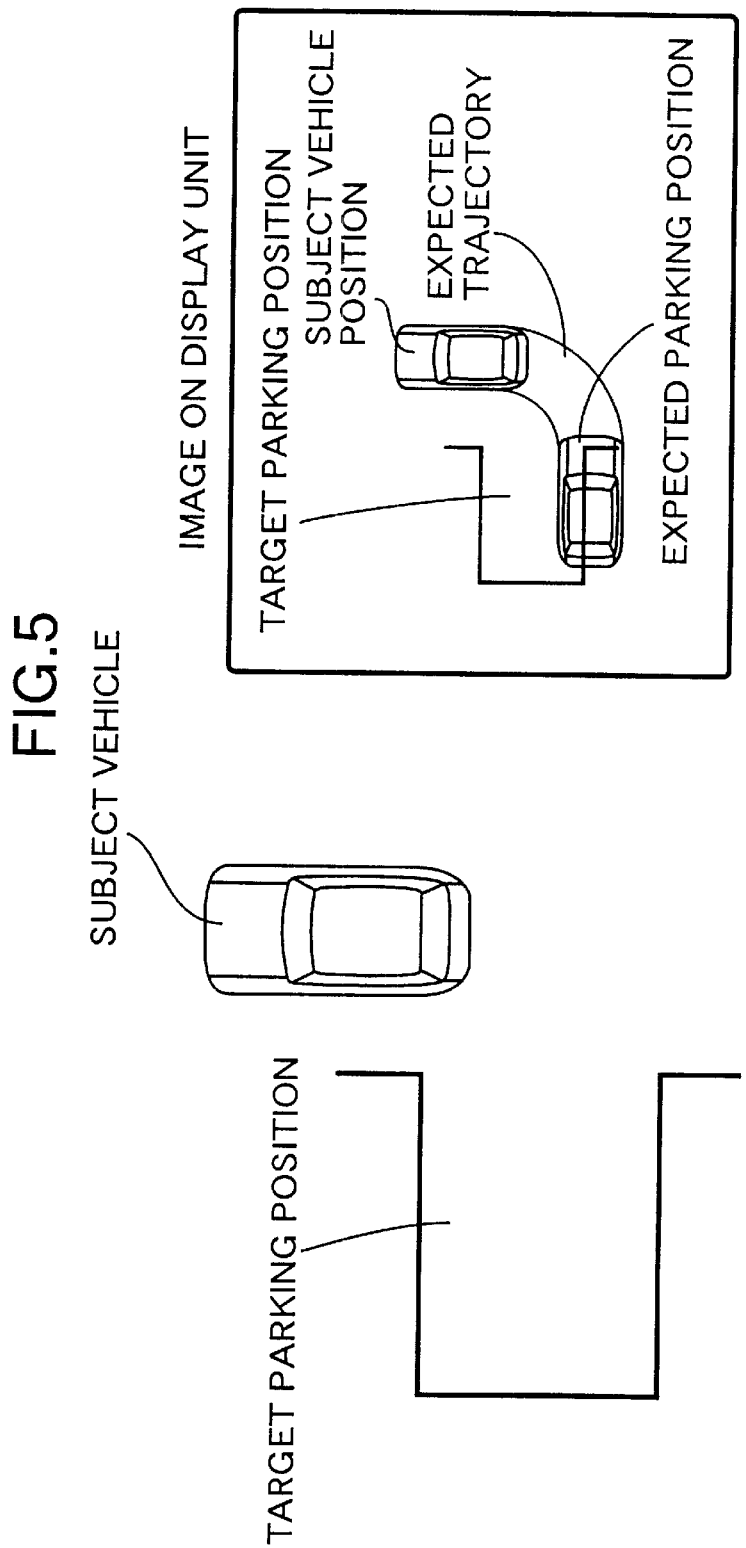
FIG. 5 is a diagram showing a state in which the subject vehicle is en route from the start position to a reverse starting position.

As shown in FIG. 4, when the subject vehicle stops at the start position, the expected parking position does not coincide with the target parking position and it is not possible to guide the subject vehicle to the target parking position even when starting reversing from the start position. When the subject vehicle travels straight on from the start position, the subject vehicle position, the expected trajectory and the expected parking position on the display unit 8 also move as shown in FIG. 5. When the subject vehicle reaches the position shown in FIG. 6 and the expected parking position correctly coincides with the target parking position, the subject vehicle position at this time becomes the correct reverse starting position. Therefore, after stopping the subject vehicle at the reverse starting position, by traveling backward while turning the steering wheel fully to the left, the subject vehicle is reliably guided to the target parking position.

The subject vehicle position, the expected trajectory, and the expected parking position on the display unit 8 move according to the distance traveled by the subject vehicle detected by the travel distance sensor 3. A vehicle speed sensor that is used as the travel distance sensor 3 outputs a predetermined number of pulses per rotation of a wheel, and the distance traveled per pulse can be calculated from the circumference of the wheel. When the vehicle speed sensor outputs, for example, n pulses per rotation of the wheel, since each of the pulse rising edges, which is measured from an L level to an H level, or falling edges, which is measured from the H level to the L level, is counted, the number counted per rotation of the wheel is n. It is to be understood that L level represents the lowest level of the pulse and H level represents the highest level of the pulse. When the lengths of the H level and the L level of the pulses are made identical, the number counted per rotation of the wheel can be defined as 2n, thereby doubling the resolution. When the number counted per rotation of the wheel is 2n, since the circumference of a wheel having a diameter of D is $\pi D$, the distance traveled $\Delta S$ per count is given by $\pi D/(2n)$.

Figure 6:
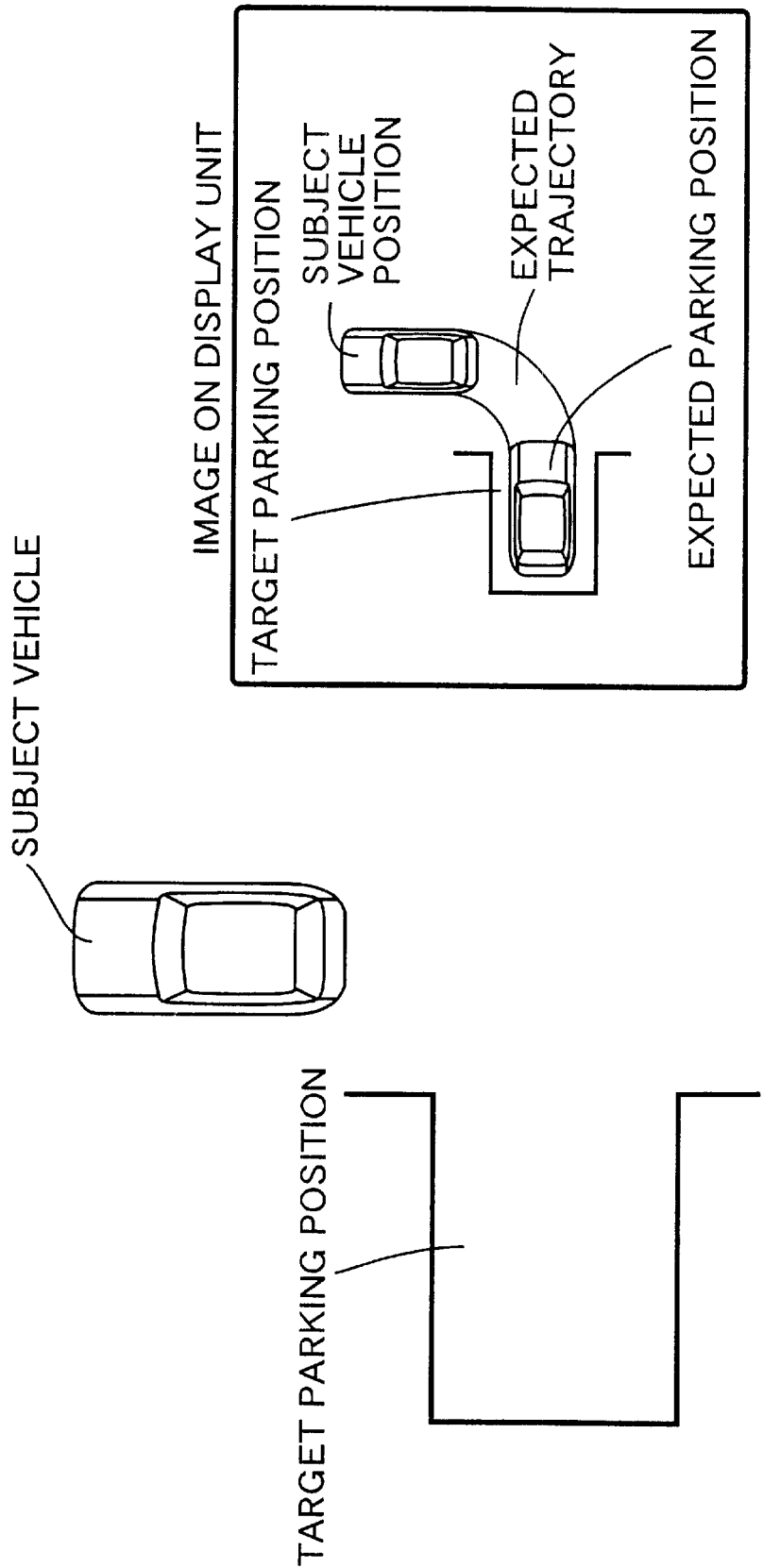
FIG. 6 is a diagram showing a state in which the subject vehicle is at the reverse starting position.
Figure 7:
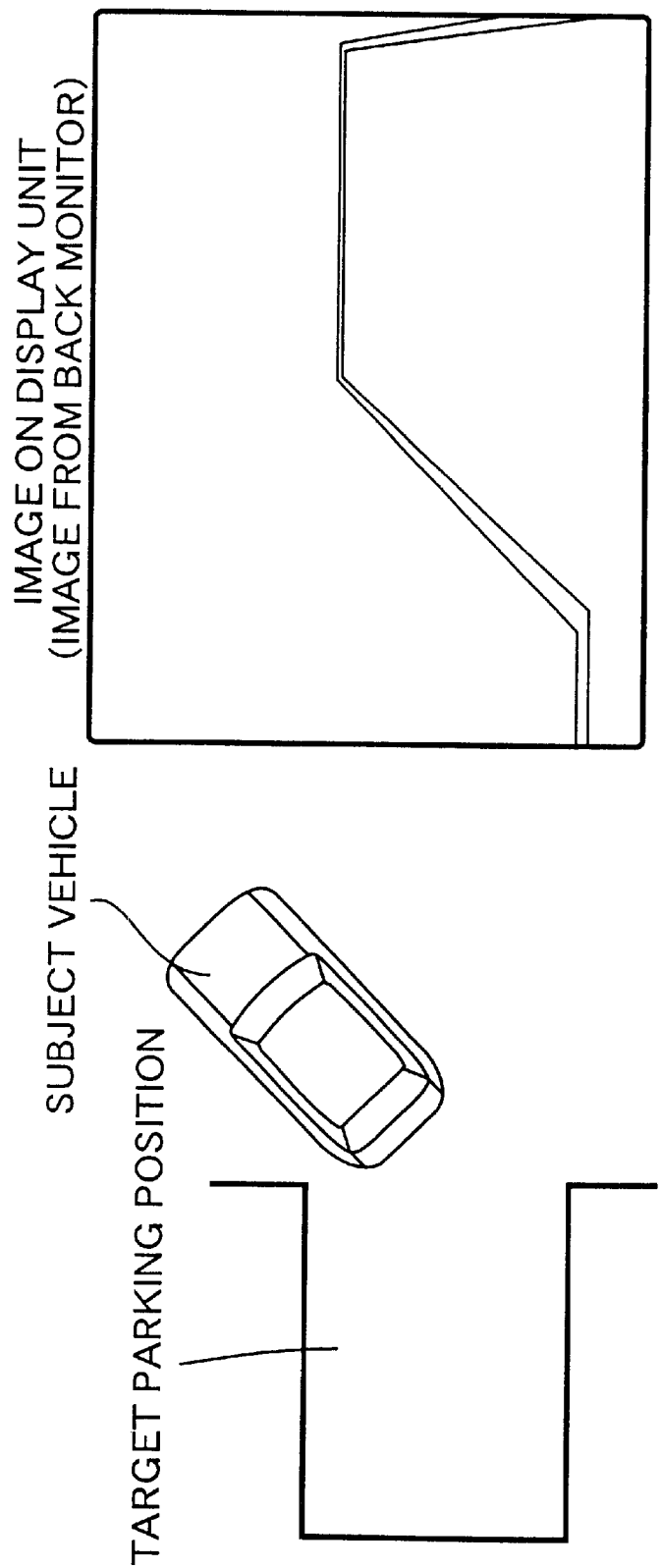
FIG. 7 is a diagram showing a state in which the subject vehicle is en route from the reverse starting position to a target parking position.

When the subject vehicle has reached the correct reverse starting position shown in FIG. 6 and the first determination means M1 and the second determination means M2, determine that the expected parking position has coincided with the target parking position, the notifying means M6 notifies the driver by operating the buzzer 9 for a predetermined time, for example, 1 second. The driver can therefore recognize not only from the image on the display unit 8 but also by the noise of the buzzer 9 that the subject vehicle has reached the correct reverse starting position. After the subject vehicle is stopped at the reverse starting position, when the reverse switch 6 detects that the driver has operated a select lever to reverse range and the travel distance sensor 3 detects that the subject vehicle has started reversing, the parking assistance is complete. When the parking assistance is complete, the display unit 8 stops displaying the target parking position, subject vehicle position, expected trajectory, and expected parking position and instead displays an image of the target parking position taken by the back monitor 7 (FIG. 7).

With regard to a notification method, the notifying means M6 may display, on the display unit 8, a predetermined character string such as 'correctly positioned' or 'OK to start reversing'.

Figure 8:
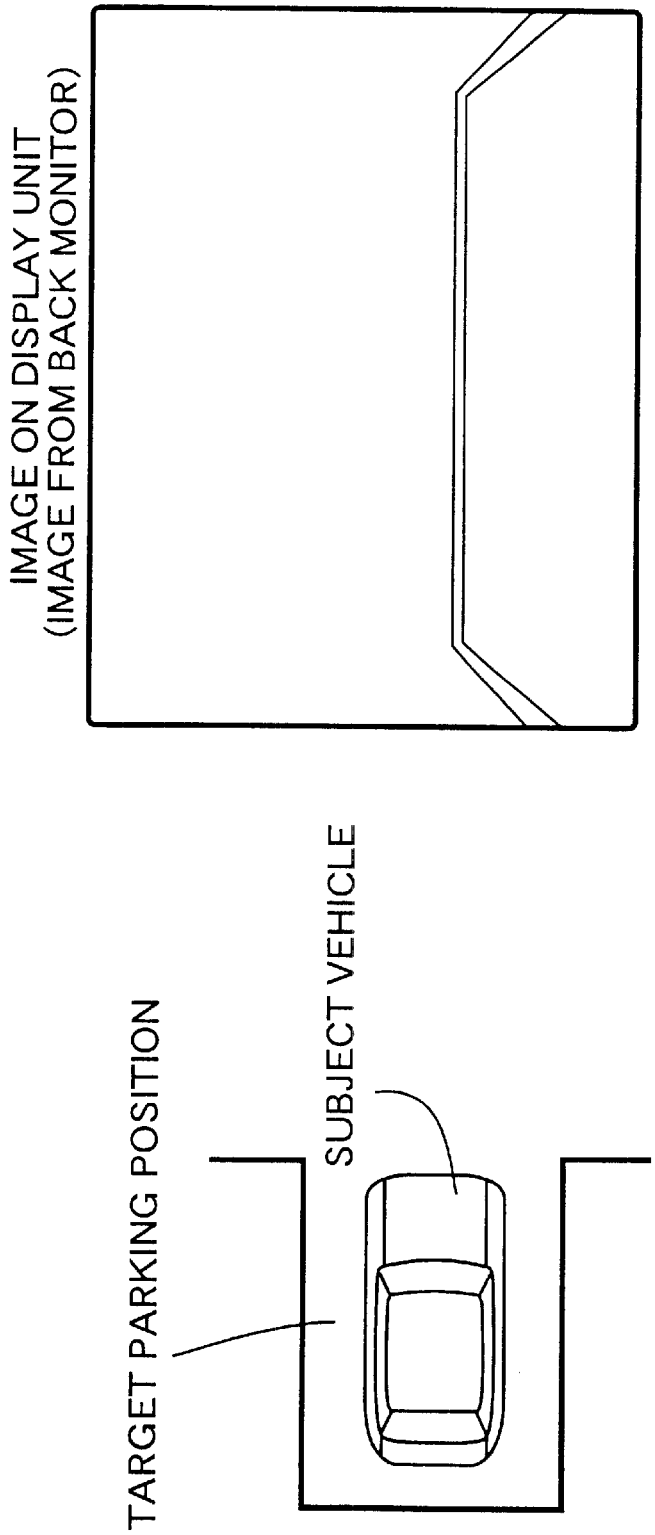
FIG. 8 is a diagram showing a state in which the subject vehicle is at the target parking position.
Figure 9:
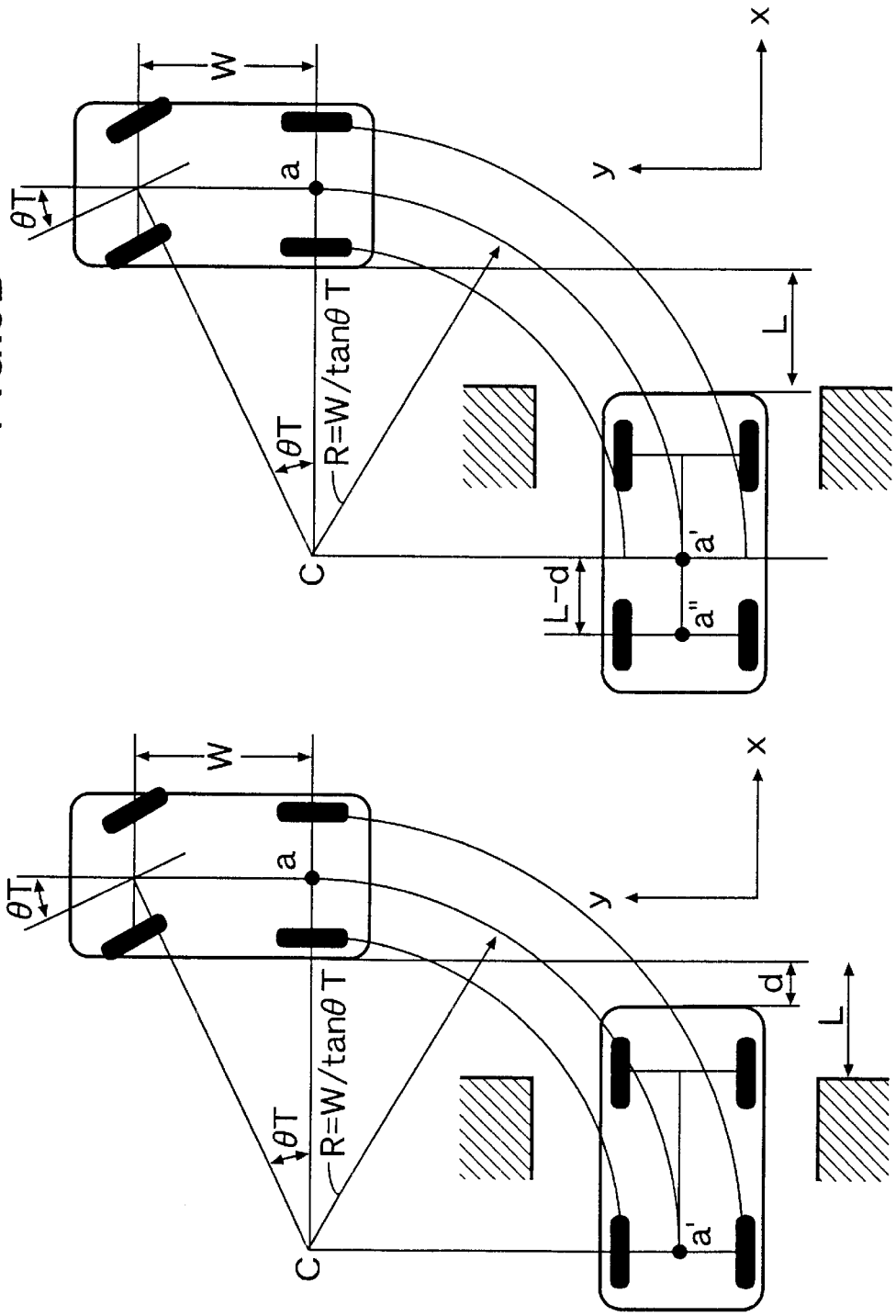
FIGS. 9A and 9B are diagrams explaining expected parking positions.

After the parking assistance is thus complete, the driver merely reverses the subject vehicle while turning the steering wheel fully to the left and the subject vehicle can thus easily and reliably be guided to the target parking position (FIG. 8).

The first determination means M1, and the second determination means M2 can determine that the subject vehicle has reached a position slightly, e.g., 50 centimeters, before the reverse starting position instead of determining that the subject vehicle has reached the reverse starting position. This is because there is slight delay before the driver stops the subject vehicle after hearing the sound of the buzzer 9. Alternatively, when a predetermined time, e.g., 3 seconds, has passed in a state in which the subject vehicle is stopped with the expected parking position coinciding with the target parking position, it can be determined that the driver has recognized that the subject vehicle has reached the correct reverse starting position and the display on the display unit 8 is changed. Furthermore, the parking assistance is suspended when the first cancellation means M4 detects that the expected parking position has passed the target parking position by 1 meter or more, when the second cancellation means M5 detects that the subject vehicle travel speed has exceeded a predetermined value, e.g. 10 km/h, when the operating switch 2 is turned off, and when the ignition switch is turned off.

The method of calculating the target parking position is now explained with reference to FIGS. 9A and 9B. The position of the vehicle is represented by a middle position 'a' between the right and left rear wheels. In general, when the vehicle turns at a very low speed, e.g. 10 km/h or slower, at which skidding of the vehicle is ignored, the turning center C of the vehicle can be determined as follows. That is to say, as shown in FIG. 9A, when the turning angle of the front wheels is $\theta T$ relative to the vehicle central line and the turning center C is on an extension of the rear wheel axle, then the distance, that is, a turning radius R, from the turning center C to the middle position 'a', which is between the right and left rear wheels, is represented by $R=W/\tan \theta T$ where W denotes the wheelbase. When 'a' is the reverse starting position and 'a' is the expected parking position, the expected parking position 'a''' is a position leftward from the reverse starting position 'a' (in the −x direction) by R and backward from the reverse starting position 'a' (in the −y direction) by R.

As described above, since the distance between the left side of the vehicle and the entrance of the target parking position, that is, the parking space, is L at the start position, the distance between the left side of the vehicle and the entrance of the parking space is L at the reverse starting position 'a', to which the vehicle has traveled straight on from the start position. When the distance between the left side of the vehicle at the reverse starting position 'a' and the front end of the vehicle at the target parking position is 'd', if d is less than L due to the size of the vehicle or the turning angle of the front wheels, the front end of the vehicle stopped at the target parking position protrudes from the parking space. In this case, as shown in FIG. 9B, the expected parking position is redefined at a position 'a'''', that is, given by further reversing the subject vehicle in a straight line from the expected parking position 'a''' by a distance L-d. In other words, a position that is moved from the reverse starting position 'a' in the -x direction by R+(L−d) and in the −y direction by R is defined as the expected parking position 'a''''', and it is thus possible to prevent the front end of the vehicle from protruding from the parking space at the expected parking position 'a''''''.

When d is larger than L, although the vehicle is positioned too deeply in the parking space at the expected parking position 'a''', this cannot be avoided since the vehicle is turned through 90° from the reverse starting position 'a', and the position 'a''' is used as the expected parking position without modification.

Figure 10:
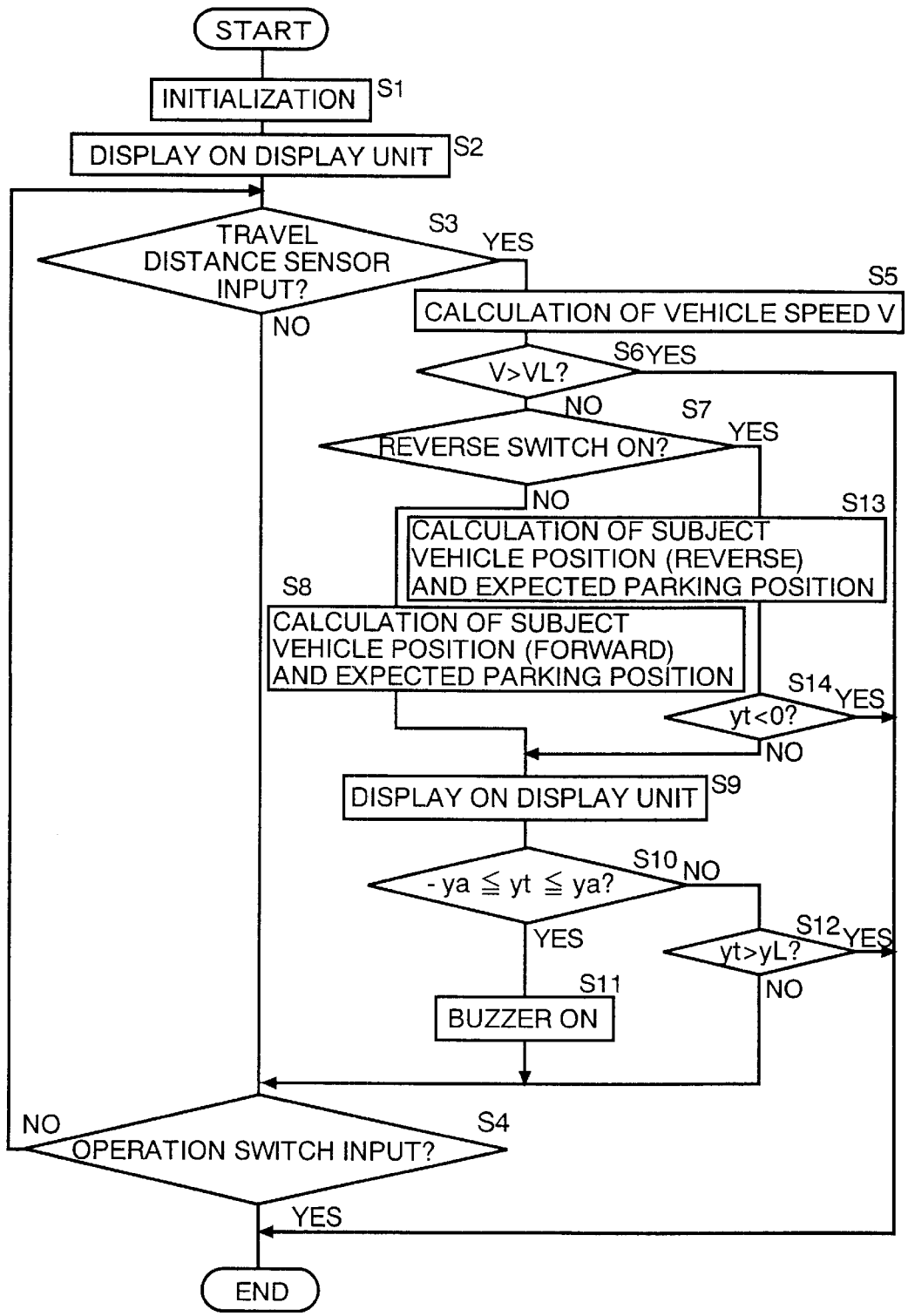
FIG. 10 is a flow chart for explaining the action of left reverse parking.

The above-mentioned action is further explained below with reference to the flow chart shown in FIG. 10.

Figure 11:
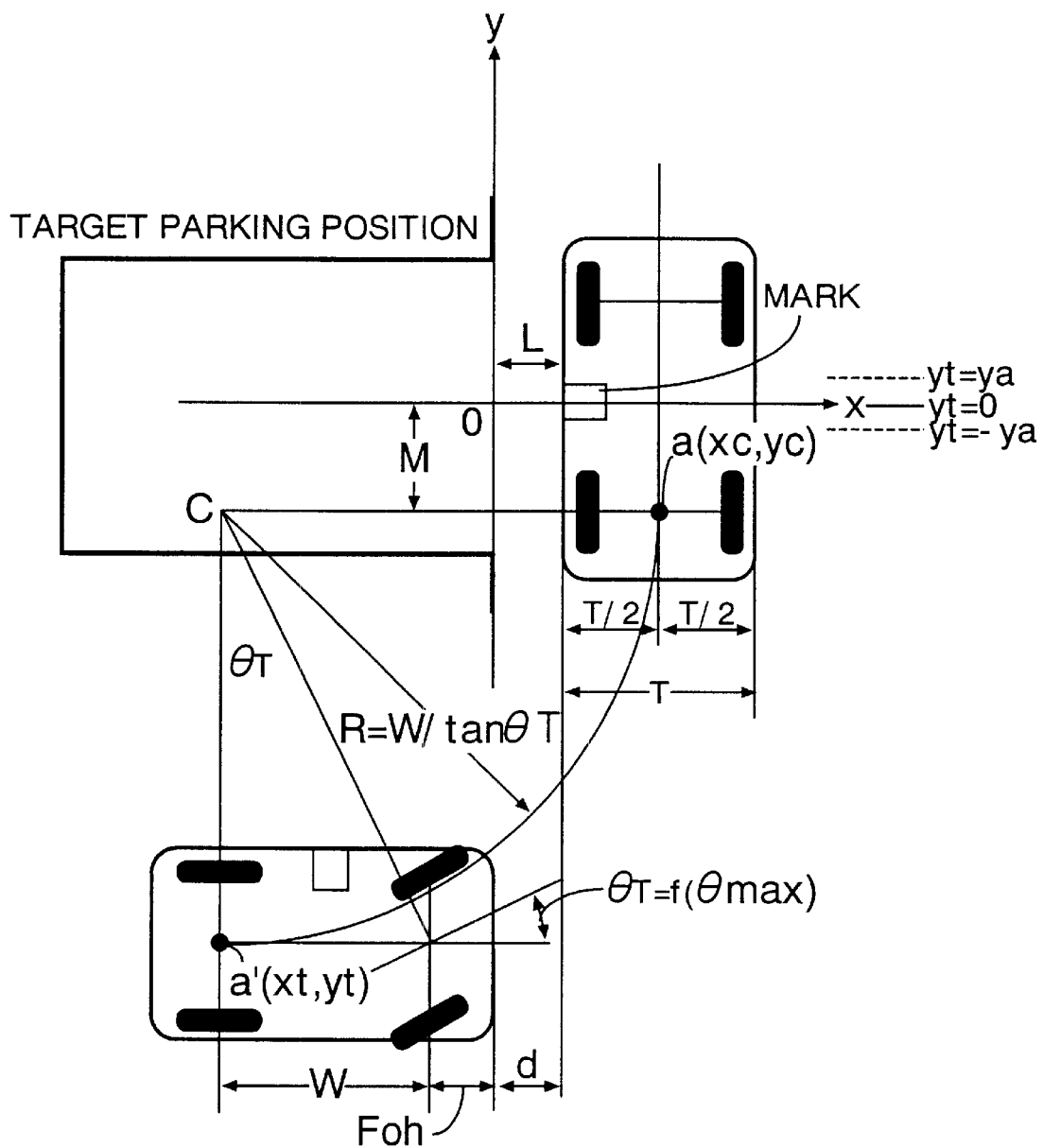
FIG. 11 is a diagram for explaining a method of calculating the coordinates of the expected parking position.

Initially, in step S1, the operating switch 2 is turned ON. As shown in FIG. 11, coordinate axes having their origin at the center of the entrance of the target parking position or parking space are provided, and a subject vehicle position 'a' and an expected parking position 'a''' are calculated and expressed in terms of (x, y) coordinates. At this point, the x coordinate xc of the subject vehicle position 'a' equals L+T/2 when the vehicle width is T and the y coordinate yc equals −M when the distance between the mark and the rear wheel axle is M. The expected parking position 'a''' is a position which is displaced from the subject vehicle position 'a' leftward (the −x direction) by the turning radius R (=W/tan $\theta T$) and backward (the −y direction) by the turning radius R (=W/tan $\theta T$). The x coordinate xt of the expected parking position 'a''' therefore equals L+T/2−R and the y coordinate yt equals −M−R.

If a distance 'd' between the left side of the vehicle at the subject vehicle position 'a' and the front end of the vehicle at the expected parking position 'a''' is less than L, as described above, it is necessary to define a position where the front end of the vehicle coincides with the entrance of the parking space as the target parking position 'a'''''. In this case, when the distance between the front end of the vehicle and the front wheel axle is Foh, the x coordinate xt of the expected parking position 'a'''''' equals −W −Foh. The x coordinate xt of the expected parking position 'a''' is therefore given by xt=xc−R using the x coordinate xc of the subject vehicle position 'a' when the operating switch 2 is tuned ON. If xt≦−W−Foh, xt=xc−R, and if xt>−W−Foh, xt=−W−Foh.

Then, in step S2, the target parking position or parking space, the subject vehicle position 'a', the expected trajectory, and the expected parking position 'a''' are displayed on the display unit 8.

In step S3, a determination is made as to whether there is no input from the travel distance sensor 3, that is, if the vehicle is stationary, step S4 confirms whether the operating switch 2 is ON. If the operating switch 2 has been turned OFF by the driver, the parking assistance is ended at this point.

If, in step S3, there is an input from the travel distance sensor 3, that is, the vehicle has started moving, the vehicle speed V is then calculated by the travel speed sensor 4 in step S5. If the vehicle speed V exceeds a vehicle speed limit VL, e.g. 10 km/h, in step S6, as there is a possibility that the calculated target trajectory might not be followed, the second cancellation means M5 ends the parking assistance. If the vehicle speed V is determined not to be above the vehicle speed limit VL in step S6 and the reverse switch 6 is not ON in step S7, that is, the vehicle is traveling forward, the coordinates of the expected parking position 'a''', which move accompanying the advancement of the vehicle, are then calculated in step S8. That is, when the distance traveled by the vehicle corresponding to one count of the pulse signal output accompanying rotation of the wheels is denoted by $\Delta S$, the x-axis component $\Delta x$ of the distance traveled $\Delta S$ is 0 and the y-axis component $\Delta y$ is $\Delta S$ when the vehicle is traveling forward. Each time the pulse signal is counted, $\Delta S$ is added to the y coordinate yc of the subject vehicle position 'a' and $\Delta S$ is added to the y coordinate yt of the expected parking position 'a'''. The coordinates of the subject vehicle position 'a' and the expected parking position 'a''' are thereby updated. In step S9, the subject vehicle position, the expected trajectory, and the expected parking position on the display unit 8 are updated.

Then, in step S10, the first determination means M1, and the second determination means M2, determine whether the expected parking position 'a''' coincides with the target parking position. Since the y coordinate yt of the expected parking position 'a''' changes in discrete steps by $\Delta S$, the expected parking position 'a''' does not necessarily coincide exactly with the target parking position. A threshold value ya (≧ΔS/2) is therefore employed, and when −ya≦yt≦ya is satisfied, it is determined that the expected parking position 'a'' coincides with the target parking position. When the expected parking position 'a'' coincides with the target parking position, the notifying means M6 operates the buzzer 9 in step S11, thus notifying the driver that the subject vehicle has reached the correct reverse starting position. By reversing after turning the steering wheel fully to the left at this position, the driver correctly guides the subject vehicle to the target parking position. If $-ya \geq yt \geq ya$ is not satisfied in step S10 and, when yL is defined as a threshold value, e.g. 1 meter, yt>yL is satisfied in step S12, in other words, the y-coordinate of the expected parking position 'a'' exceeds the y-coordinate of the target parking position by the threshold value yL, and the first cancellation means M4 detects the excess and ends the parking assistance.

On the other hand, when the reverse switch 6 is ON in step S7, that is to say, when the vehicle is reversing, the coordinate of the expected parking position 'a'', which moves accompanying the reversing of the vehicle, is calculated in step S13. In this case, each time a pulse signal is counted, $\Delta S$ is subtracted from the y coordinate yc of the subject vehicle position 'a' and $\Delta S$ is subtracted from the y coordinate yt of the expected parking position 'a''. The coordinates of the subject vehicle position 'a' and the expected parking position 'a'' are thereby updated. Even when the expected parking position 'a'' moves past the target parking position to some extent, by reversing the vehicle, the expected parking position 'a'' coincides with the target parking position. When the y coordinate yt of the expected parking position 'a'' is less than 0 in step S14, it is determined that the vehicle has started reversing from the reverse starting position and the parking assistance is ended.

Therefore, even if the left reverse parking is started in a state in which the expected parking position 'a'' has passed the target parking position, that is, in a state in which the subject vehicle position 'a' has passed the correct reverse starting position, by reversing the subject vehicle while decreasing the steering angle from the maximum steering angle according to the excess distance, the subject vehicle can be guided correctly to the target parking position.

As described above, in accordance with the first embodiment of the present invention, it is unnecessary to employ image processing devices such as cameras, radars and corner sensors for detecting the parking space and calculate the steering operation, braking operation, acceleration, gear shift operation, and the like to move the subject vehicle to the target parking position along the expected trajectory, thereby achieving a cost efficient parking aid system.

The second embodiment of the present invention is explained below with reference to FIGS. 12 to 18.

Figure 12:
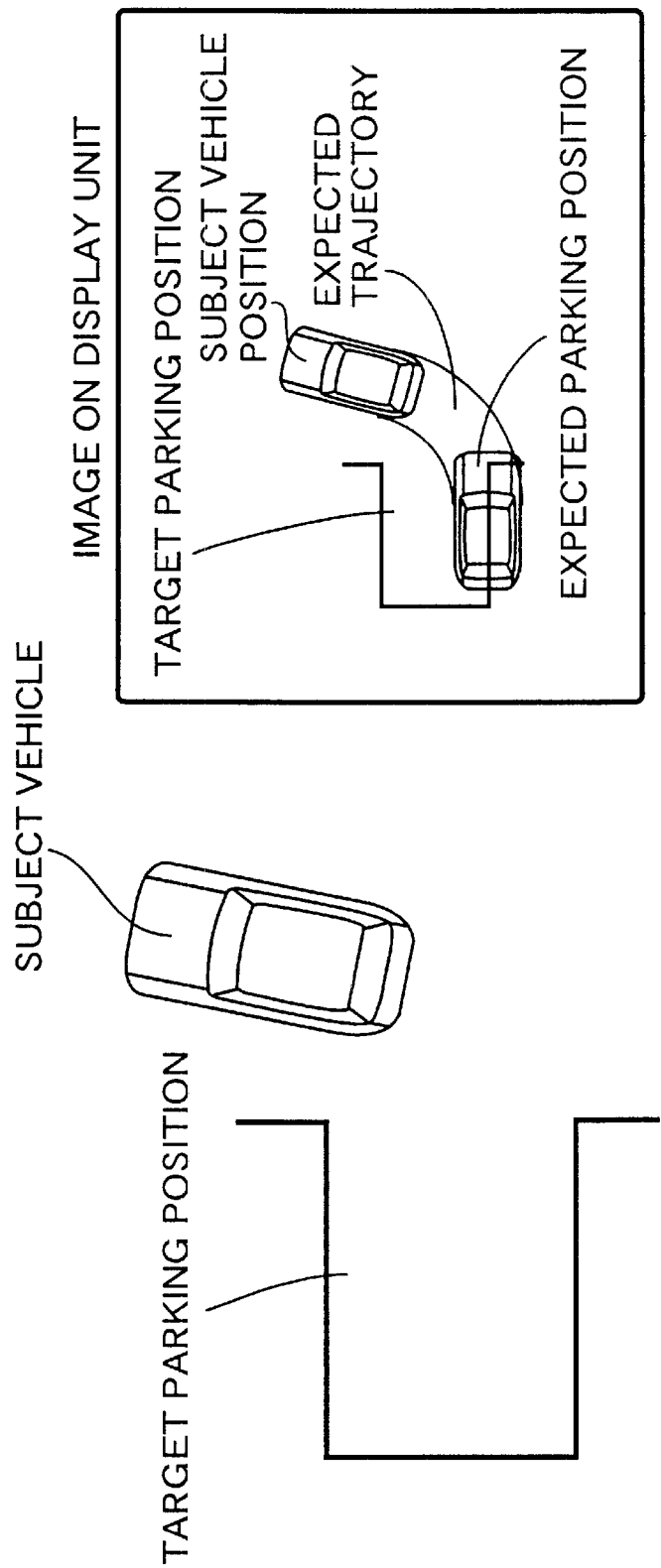
FIG. 12 is a diagram showing a state in which a subject vehicle is at a reverse starting position according to a second embodiment of the invention.
Figure 13:
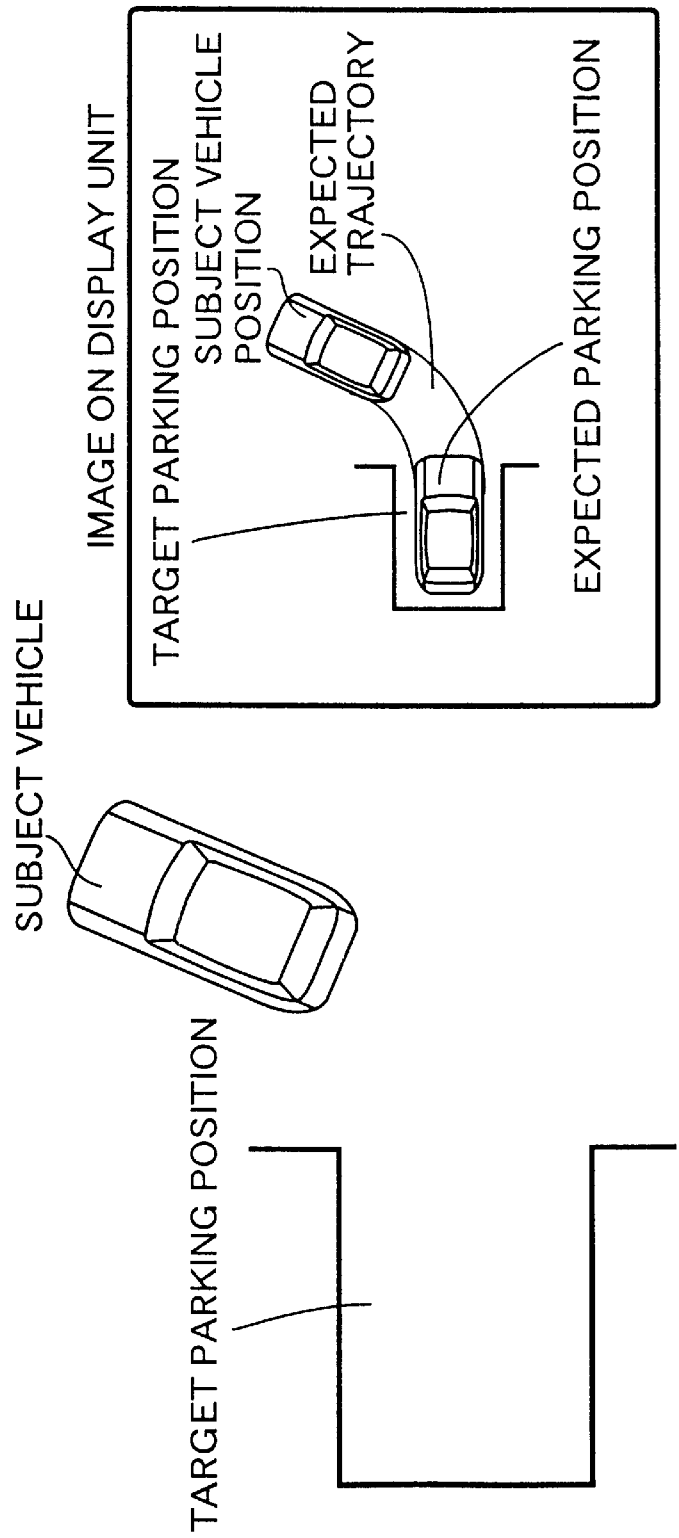
FIG. 13 is a diagram showing a state in which the subject vehicle is at the reverse starting position.

In the above-described first embodiment, when left reverse parking is performed, the subject vehicle travels forward in a straight manner from the start position to the reverse starting position. In the second embodiment, the subject vehicle travels forward and to the right from the start position to the reverse starting position. The state at the start position is the same as that of the first embodiment shown in FIG. 4, and FIG. 12 illustrates a state where the subject vehicle has traveled forward and to the right from the start position. As the subject vehicle travels forward and to the right from the start position, the subject vehicle position is calculated based on the distance traveled detected by the travel distance sensor 3 and the steering angle detected by the steering angle sensor 5. The expected parking position is calculated when the subject vehicle is reversed with the maximum steering angle from the above-mentioned subject vehicle position as the reverse starting position. The display unit 8 displays the subject vehicle position, the expected parking position, the expected trajectory, and the target parking position. As shown in FIG. 13, the subject vehicle is stopped at the reverse starting position where the expected parking position coincides with the target parking position. By reversing the subject vehicle from the reverse starting position while turning the steering wheel fully to the left, the subject vehicle can be guided to the target parking position correctly as in the first embodiment.

The above-mentioned action is explained below in detail with reference to the flow chart shown in FIG. 14. As is clear from comparing the flow chart of FIG. 14 with the flow chart of FIG. 10 of the first embodiment, the present embodiment has the additional step S15 between steps S6 and S7 and the contents of steps S8', S13' and S14 are different from those of the above-mentioned steps S8, S13 and S14. Otherwise, the steps of the second embodiment are the same as those in the first embodiment and the explanation therefore centers on the differences from the first embodiment.

Figure 15A:
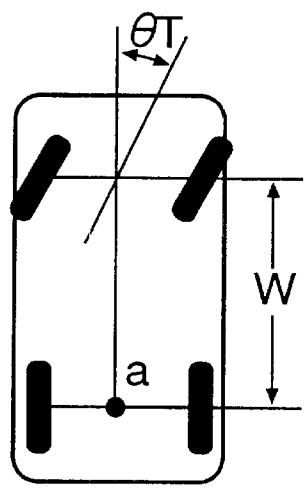
FIGS. 15A and 15B are diagrams for explaining a four wheel vehicle model and a two wheel vehicle model.
Figure 15B:
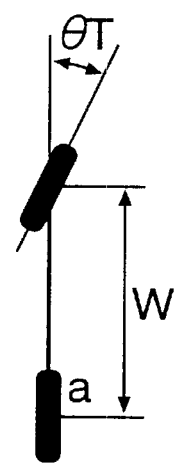

After the steering angle $\theta$ is detected by the steering angle sensor 5 in step S15, the subject vehicle position 'a' and the expected parking position 'a'' are calculated in steps S8' and S13'. The sign of the steering angle $\theta$ is '+' when steering right and '−' when steering left. In addition, in order to simplify the calculation, the four-wheel model in FIG. 15A is replaced with the two wheel model in FIG. 15B in the present embodiment.

In FIG. 16A, the vehicle inclination relative to the y axis is $\beta$ at a subject vehicle position a1 (xc1, yc1), which is shown by white wheels. The subject vehicle travels forward from the subject vehicle position a1 by a distance corresponding to a count of the pulse signal with a front wheel turning angle $\theta T$ to a subject vehicle position a2 (xc2, yc2), which is shown by black wheels. When the distance traveled from the position a1 to the position a2 is $\Delta u$ and the turning radius is R (=W/tan $\theta T$), the vehicle inclination increases by $\alpha = \Delta u/R$ to become $\beta + \alpha$. The coordinates (xc2, yc2) of the subject vehicle position a2 can be expressed in terms of the coordinates (xc1, yc1) of the subject vehicle position a1 as follows:

$$xc2 = xc1 + \{R\cos\beta - R\cos(\beta + \alpha)\}$$
$$= xc1 + R\{\cos\beta - \cos(\beta + \alpha)\}$$
$$yc2 = yc1 + \{R\sin(\beta + \alpha) - R\sin\beta\}$$
$$= yc1 + R\{\sin(\beta + \alpha) - \sin\beta\}$$

When a vehicle speed sensor is used as the travel distance sensor 3, the distance traveled detected by the travel speed sensor is the distance traveled by the outer front turning wheel in the case of a front wheel drive vehicle and the distance traveled by the outer rear turning wheel in the case of a rear wheel drive vehicle. The reason is that the vehicle speed sensor generally does not detect the rotation of a wheel but rather the rotation of a transmission shaft. Since the rotation of an inner turning wheel having a small turning radius, that is, traveling a small distance, is decelerated by a differential gear during turning, the rotation of the wheel cannot be detected correctly by the vehicle speed sensor.

When a wheel speed sensor provided on each of the wheels is used as the travel distance sensor 3, the wheel speed sensor can detect the distance traveled by the wheel on which the wheel speed sensor has been mounted.

For example, when the travel distance sensor 3 detects the distance traveled by the outer front turning wheel, the inclination a when the vehicle travels by a count is given by $\alpha=\Delta S/Rfo$ where $\Delta S$ is the distance traveled per count and Rfo is the turning radius of the outer front turning wheel. When the travel distance sensor 3 detects the distance traveled by the inner front turning wheel, the inclination $\alpha$ when the vehicle travels by a count is given by $\alpha=\Delta S/Rfi$ where $\Delta S$ is the distance traveled per count and Rfi is the turning radius of the inner front turning wheel. When the travel distance sensor 3 detects the distance traveled by the outer rear turning wheel, the inclination a when the vehicle travels by a count is given by $\alpha=\Delta S/Rro$ where $\Delta S$ is the distance traveled per count and Rro is the turning radius of the outer rear turning wheel. When the travel distance sensor 3 detects the distance traveled by the inner rear turning wheel, the inclination a when the vehicle travels by a count is given by $\alpha=\Delta S\, Rri$ where $\Delta S$ is the distance traveled per count and Rri is the turning radius of the inner rear turning wheel.

Figure 17:
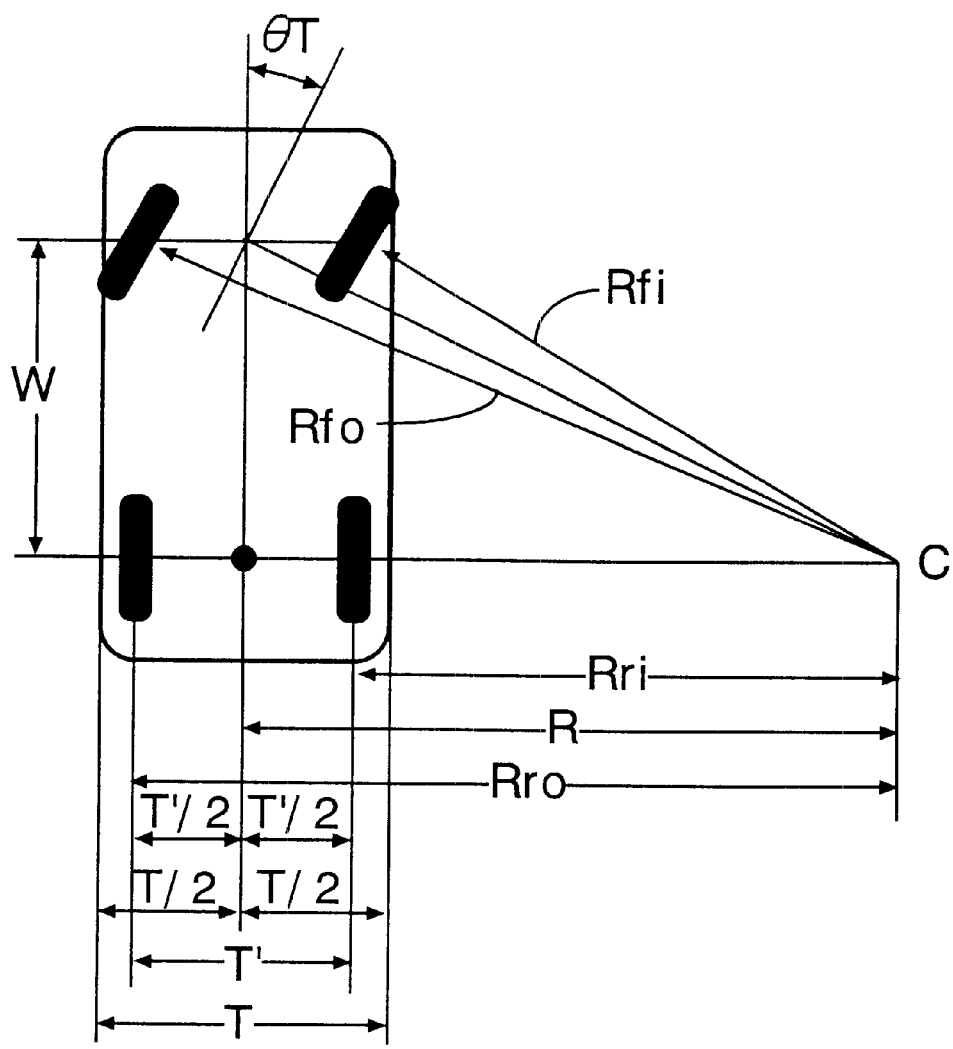
FIG. 17 is a diagram explaining the turning radius of a four wheel vehicle.

As shown in FIG. 17 the turning radius Rro of the outer rear turning wheel is given by:

$$Rro = R + T'/2$$

and the turning radius Rri of the inner rear turning wheel is given by:

$$Rri = R - T'/2$$

where T' is the tread between the right and left wheels.

The turning radius Rfo of the outer front turning wheel is given by:

$$Rfo = (W^2 + Rro^2)^{1/2}$$

and the turning radius Rfi of the inner front turning wheel is given by:

$$Rfi = (W^2 + Rri^2)^{1/2}$$

While taking into consideration the above-mentioned points, for example, the coordinates (xc2, yc2) of the subject vehicle position a2 after movement can be expressed as follows using the coordinates (xc1, yc1) of the subject vehicle position a1 before movement from the relationship shown in FIG. 16A when the vehicle speed sensor of a front wheel drive vehicle is used as the travel distance sensor 3:

$$\begin{aligned}
xc2 &= xc1 + \Delta x \\
&= xc1 + R\{\cos\beta - \cos(\beta + \alpha)\} \\
&= xc1 + (W/\tan\theta T)\{\cos\beta - \cos(\beta + \alpha)\} \\
yc2 &= yc1 + \Delta y \\
&= xc1 + R\{\sin(\beta + \alpha) - \sin\beta\} \\
&= xc1 + (W/\tan\theta T)\{\sin(\beta + \alpha) - \sin\beta\} \\
\alpha &= \Delta S/Rfo \\
&= \Delta S / (W^2 + Rro^2)^{1/2} \\
&= \Delta S / \{W^2 + (W/\tan\theta T + T'/2)^2\}^{1/2}
\end{aligned}$$

The subject vehicle position 'a' can thus be updated by calculating the change $\Delta x$ of the x coordinate and the change $\Delta y$ of the y coordinate each time the pulse signal is counted and by adding these changes $\Delta x$ and $\Delta y$ to the coordinates (xc1, yc1) of the current subject vehicle position a1, thereby calculating the subject vehicle position 'a' sequentially. At this point, a vehicle inclination of $\beta+\alpha$ is used as a new inclination $\beta$. In addition, since $\beta=0$ at the start position, in the initialization of step S1, $\beta$ is set at 0.

Next, calculation of the subject vehicle position 'a' when the subject vehicle reverses in step S13' is explained. As shown in FIG. 16B, using the same method as that used for calculating the subject vehicle position 'a' when traveling forward, the following equations can be derived. It can be understood that the $\alpha$ for forward travel is replaced by $-\alpha$ in the case of reversing.

$$\begin{aligned}
xc2 &= xc1 + \{R\cos\beta - R\cos(\beta - \alpha)\} \\
&= xc1 + R\{\cos\beta - \cos(\beta - \alpha)\} \\
yc2 &= yc1 + \{R\sin(\beta - \alpha) - R\sin\beta\} \\
&= yc1 + R\{\sin(\beta - \alpha) - \sin\beta\}.
\end{aligned}$$

When the coordinates of the subject vehicle position 'a' are (xc, yc), $\Delta x$ and $\Delta y$ are calculated each time the subject vehicle reverses by a count, and the coordinates (xc+$\Delta x$, yc+$\Delta y$) obtained by adding $\Delta x$ and $\Delta y$ to the subject vehicle position 'a' (xc, yc) are used as the new subject vehicle position 'a' (xc, yc), thereby calculating the subject vehicle 'a'. At this point, a vehicle inclination of $\beta-\alpha$ a is used as a new inclination $\beta$.

Figure 18:
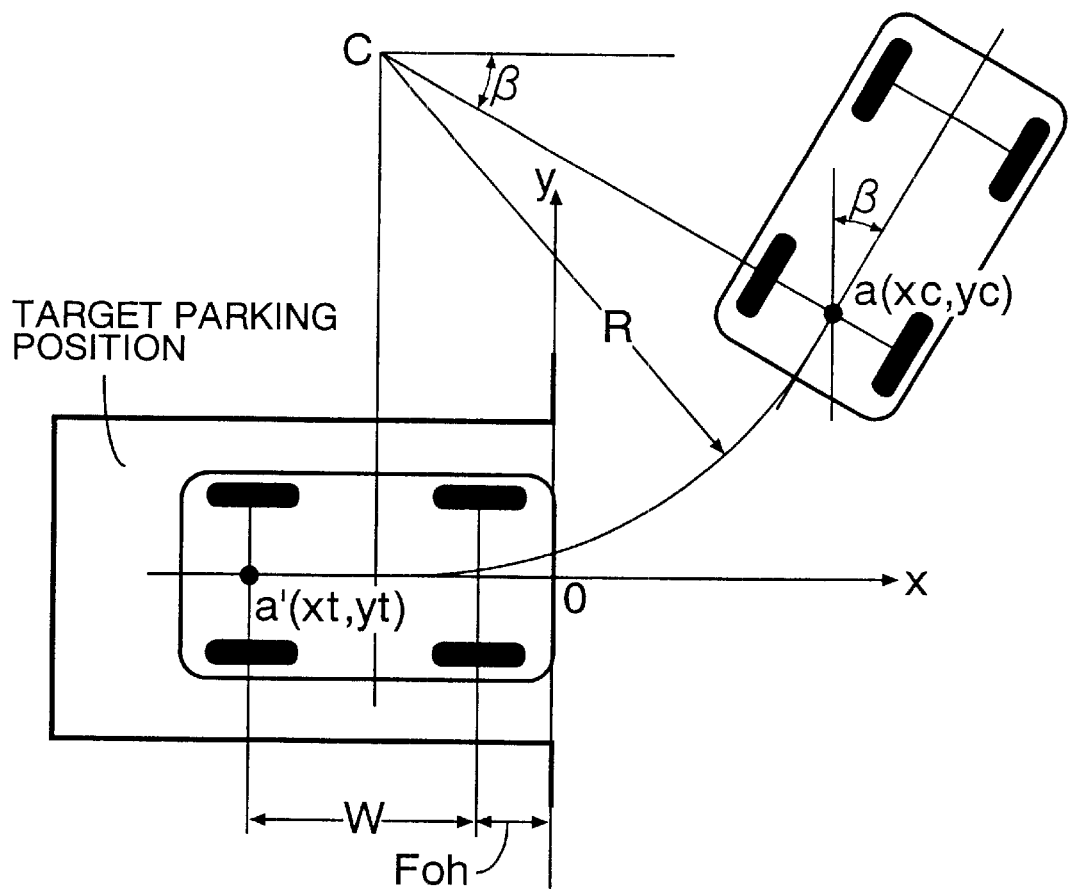
FIG. 18 is a diagram explaining a method of calculating the coordinates of the expected parking position.

Next, calculation of the expected parking position 'a'' is explained. The idea is the same as that used in the first embodiment. As shown in FIG. 18, the subject vehicle reverses from the subject vehicle position 'a' while maintaining the front wheel steering angle $\theta$ at the maximum steering angle to the left of $\theta T$, and a position where the vehicle inclination becomes 90° relative to the start position is an expected parking position 'a''. In detail, when the coordinates of the subject vehicle position 'a' are (xc, yc) and the vehicle inclination is $\beta$, the x coordinate xt of the expected parking position 'a'' is given by xt=xc–R cos $\beta$–W/2 from FIG. 18. As is the case with the first embodiment, when xt (=xc–R cos $\beta$–W/2)>–W–Foh, as shown in FIG. 18, xt=–W–Foh. The y coordinate yt of the expected parking position 'a'' is given by yt=yc–(R–R sin $\beta$)=yc–R(1–sin $\beta$) from FIG. 18. In addition, xc, yc and $\beta$ can be obtained in the same manner as for the above-mentioned calculation of subject vehicle position 'a'.

In step S14', if it is determined that the driver has started left reverse parking, the parking assistance is ended. That is, in the case of left reverse parking, since the driver reverses the vehicle by turning the steering wheel to the left, if the steering angle $\theta$ detected by the steering angle sensor 5 exceeds a predetermined value $\theta s$, e.g. 360°, when the vehicle is reversing, it is determined that left reverse parking has started and the parking assistance is ended. As described above, since the sign of the steering angle $\theta$ when the steering wheel is being turned left is minus, in step S14', the determination of whether the steering angle $\theta$ exceeds the predetermined value $\theta s$ is expressed as $-\theta<-\theta s$.

The third embodiment of the present invention is explained below with reference to FIGS. 19 to 22.

In the third embodiment of the present invention, when left reverse parking is carried out, the subject vehicle travels forward and to the right from a start position to a reverse starting position in the same manner as in the above-described second embodiment. The course along which the subject vehicle moves from the start position to the reverse starting position is the same as that in the second embodiment illustrated in FIGS. 12 and 13.

Figure 19:
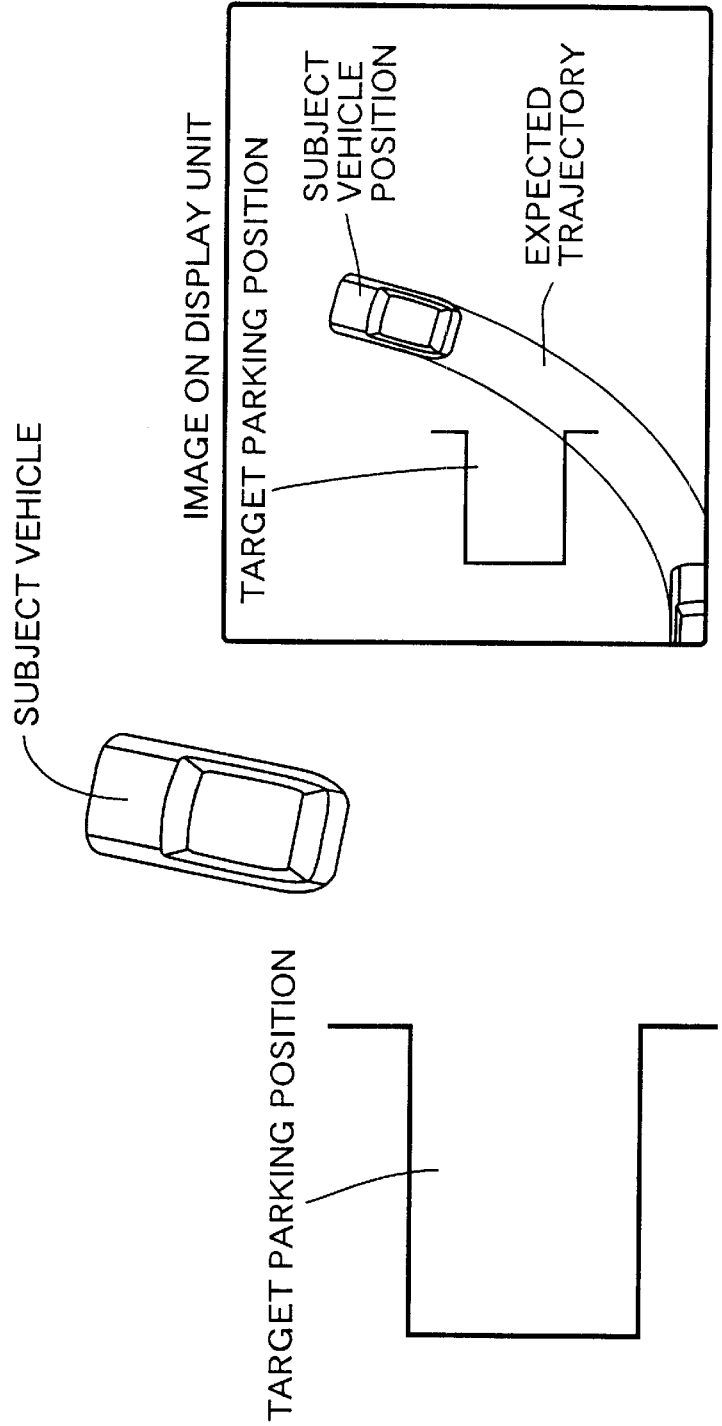
FIG. 19 is a diagram showing a state in which a subject vehicle is at a reverse starting position, according to a third embodiment of the invention.
Figure 20:
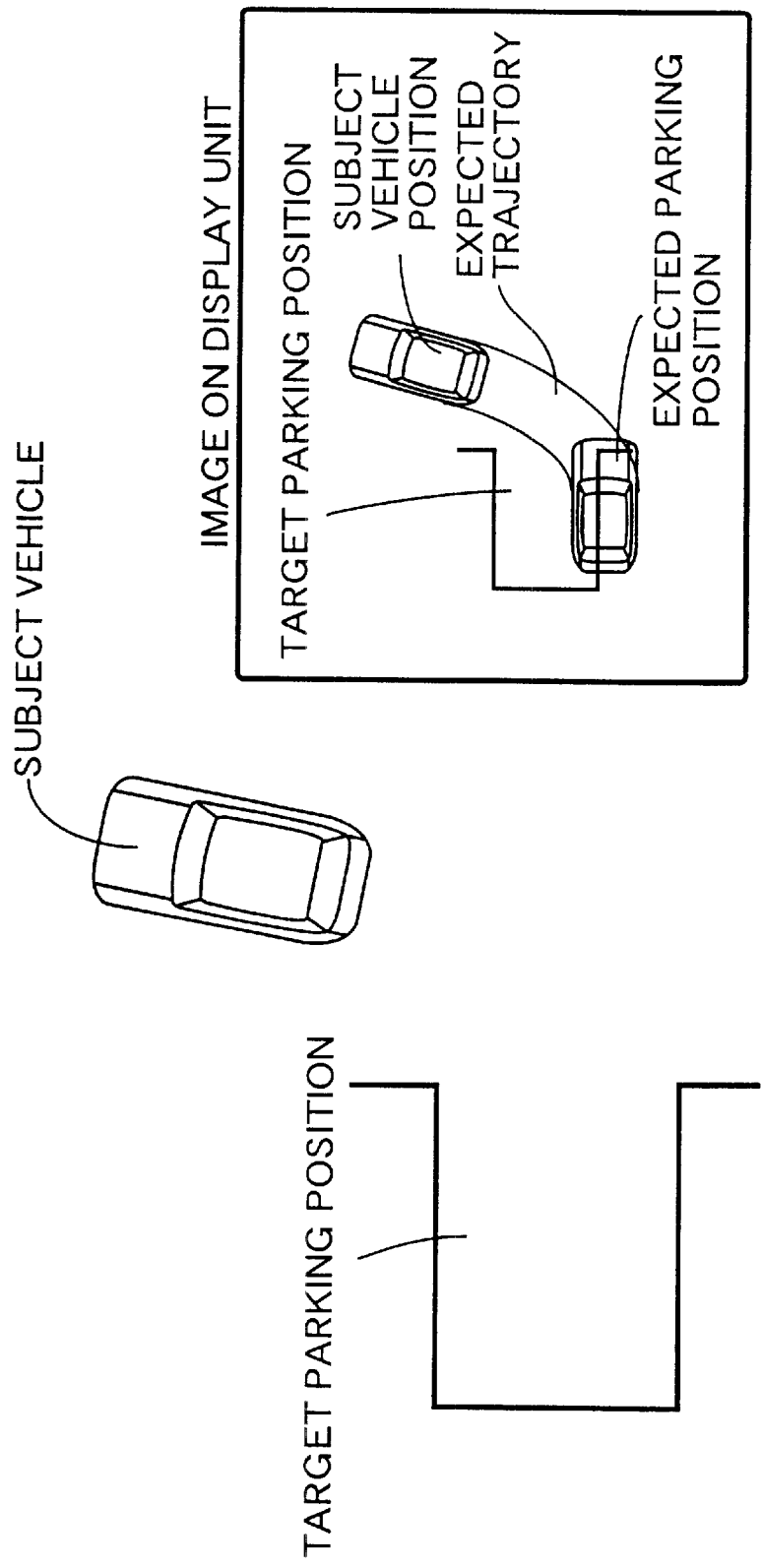
FIG. 20 is a diagram showing a state in which the subject vehicle is at the reverse starting position.

As shown in FIG. 13, when the subject vehicle reaches a correct reverse starting position, the first determination means M1, and the second determination means M2, determine that the expected parking position displayed on the display unit 8 coincides with the target parking position, and the notifying means M6 notifies the driver by operation of the buzzer 9. The expected trajectory and the expected parking position at this point are those that are obtained if the subject vehicle is reversed while maintaining the steering wheel at the maximum steering angle to the left. When the reverse switch 6 detects that the driver has stopped the vehicle at the reverse starting position and shifted the select lever to reverse range, the expected trajectory and the expected parking position on the display unit 8 are changed from those obtained if the vehicle is reversed with the maximum steering angle to those obtained in the case where the vehicle is reversed with the current steering angle (FIG. 19). As shown in FIG. 19, since the steering angle is small, the turning radius increases and the expected parking position is outside the display unit 8.

By changing the displayed color or line type, such as line thickness, solid line, broken line, dotted line, and the like, of the target parking position, the subject vehicle position, the expected trajectory, and the expected parking position on the display unit 8 accompanying the above-mentioned changes in the display, the driver can reliably recognize that the display has changed so as to accord with the current steering angle.

Figure 21:
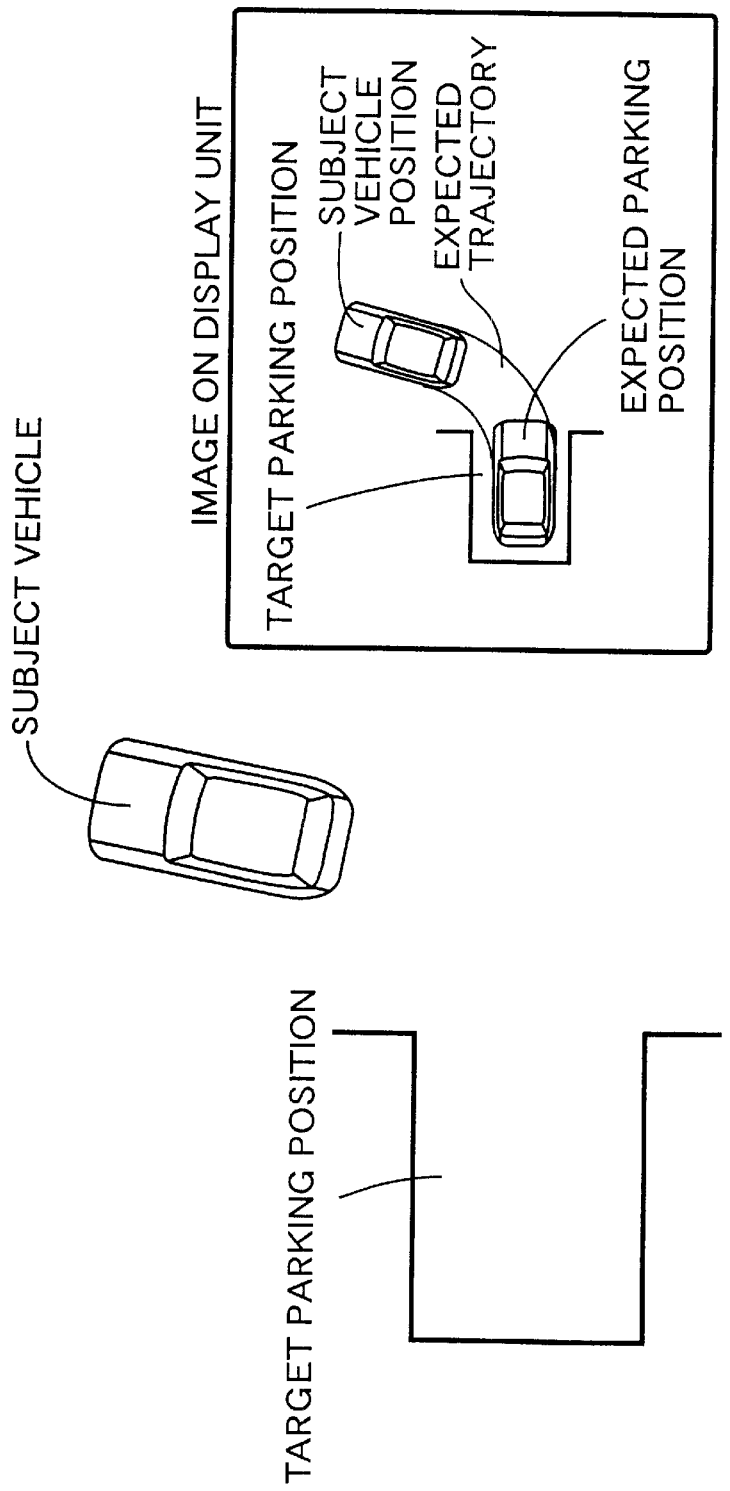
FIG. 21 is a diagram showing a state in which the subject vehicle is at the reverse starting position.

When the steering wheel is being turned to the left in a state where the subject vehicle has stopped at the reverse starting position, the expected parking position accordingly gradually approaches the target parking position (FIG. 20) and finally coincides with the target parking position (FIG. 21). Therefore, if the vehicle is reversed while maintaining the steering angle in that state, the subject vehicle can correctly be guided to the target parking position. Since the expected parking position can thus be freely changed by adjusting the steering angle, even when the subject vehicle stops after passing beyond the correct reverse starting position to some extent, the subject vehicle can be guided to the target parking position therefrom without any difficulty.

When the expected parking position is made to coincide with the target parking position by turning the steering wheel, if a predetermined time, e.g., 3 seconds, has passed in a state where the steering angle is maintained, it can also be determined that the driver has recognized the correct reverse starting position, and the notifying means 6 notifies the driver by changing the display on the display unit 8 or operating the buzzer 9.

Figure 22:
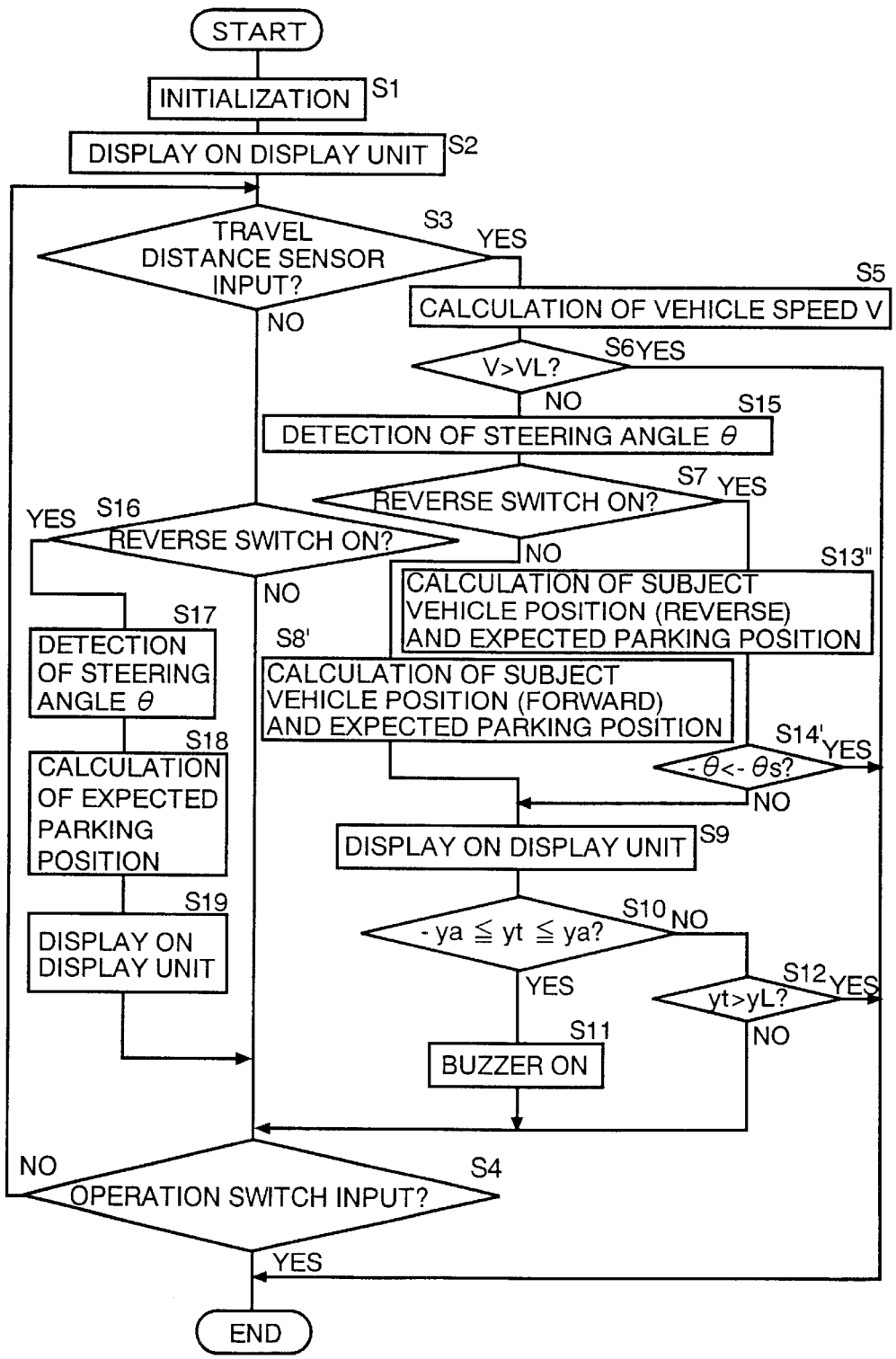
FIG. 22 is a flow chart explaining the action of left reverse parking.

The above-mentioned action is explained below in detail by reference to the flow chart of FIG. 22. As is clear from comparing the flow chart of FIG. 22 with the flow chart of FIG. 14 of the second embodiment, the third embodiment has additional steps S16 to S19 between steps S3 and S4, and the content of step S13" is different from that of the above-mentioned corresponding step S13'. Otherwise, the remaining steps are the same as those in the second embodiment and the explanation therefore centers on the differences from the second embodiment.

When the vehicle stops at the reverse starting position and there is no input from the travel distance sensor 3 in step S3, if the reverse switch 6 is ON and reverse range is selected in step S16, the steering angle sensor 5 detects a steering angle θ in step S17. An expected parking position corresponding to the steering angle θ so detected is calculated in step S18, and this expected parking position is displayed on the display unit 8 in step S19. When the expected parking position coincides with the target parking position as a result of a steering operation in the above-mentioned step S17 and reversing is started from the reverse starting position, since there is an input from the travel distance sensor 3 in step S3 of the next loop, the routine moves on to step S5.

Calculation of the expected parking position in step S13" uses the steering angle θ detected in the above-mentioned step S17. The expected parking position in the case where the vehicle reverses with the current steering angle θ is thus displayed on the display unit 8, and the driver can thereby recognize the updated expected parking position.

In the first to third embodiments described above, left reverse parking is illustrated, and although right and left are inverted in right reverse parking, the operations are substantially the same as those in the above-mentioned left reverse parking; an explanation would be redundant and is therefore omitted.

The fourth embodiment of the present invention regarding parking assistance in left parallel parking is explained below with reference to FIGS. 23 to 35.

Figure 23:
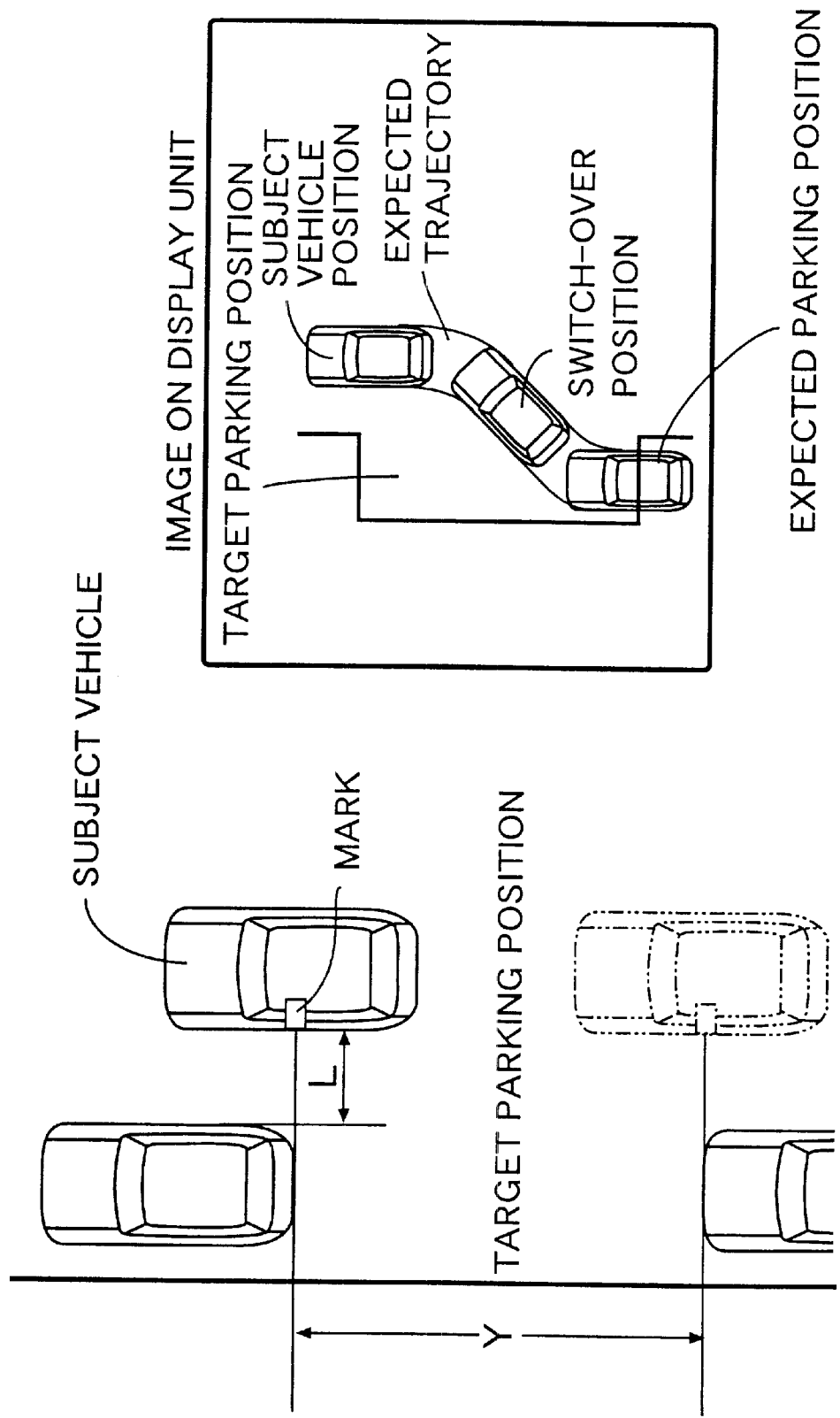
FIG. 23 is a diagram showing a state in which a subject vehicle is at a start position, according to a fourth embodiment of the invention.

As shown in FIG. 23, when carrying out left parallel parking, firstly the driver initially approaches a target parking position or parking space so that the vehicle is parallel to the target parking position and stops the subject vehicle at a position or start position where a mark is provided, for example, inside a door, that coincides with the outside front corner of the target parking position and a predetermined distance L is ensured between the subject vehicle and the entrance of the target parking position. When the driver turns the operation switch 2 ON so as to select a 'left parallel parking mode' at this position, the display unit 8 displays the target parking position, the subject vehicle position, an expected trajectory from the subject vehicle position to the target parking position, an expected parking position when the expected trajectory is followed, and a switch-over position where the steering angle is changed over on the expected trajectory. When the subject vehicle is at the start position, the expected parking position does not coincide with the target parking position.

The driver therefore moves the subject vehicle forward from the start position to the reverse starting position and stops. After turning the steering wheel to the maximum steering angle to the left, the driver reverses the vehicle to the switch-over position and stops. Then, after turning the steering wheel to the maximum steering angle to the right, the driver reverses the vehicle to the expected parking position. In other words, left parallel parking is a combination of a first half comprising left reverse parking and a second half comprising right reverse parking, which can be considered as an application of the above-mentioned third embodiment. The switch-over position in the third embodiment thus corresponds to the target parking position of left reverse parking, which is the first half of left parallel parking.

Figure 24:
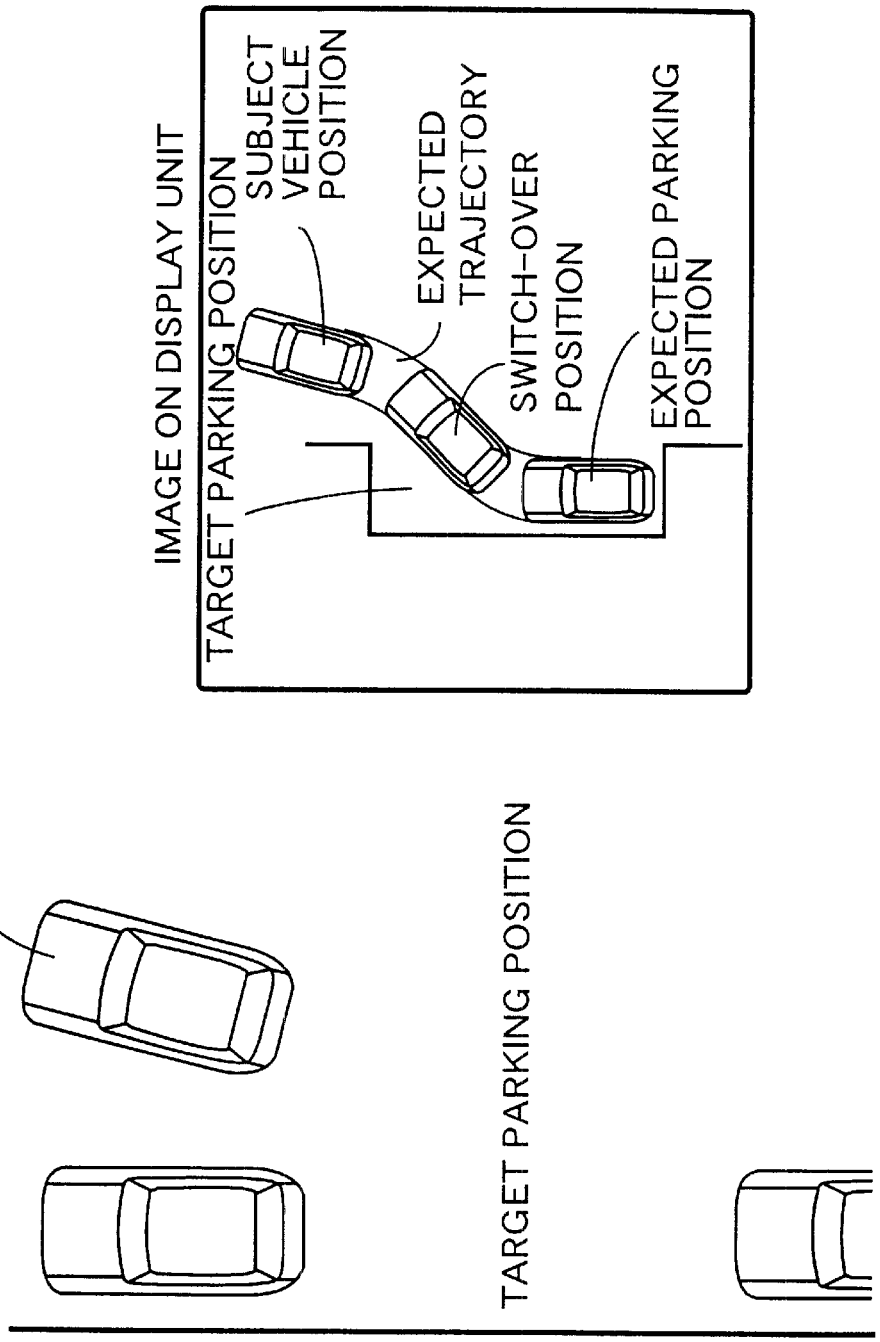
FIG. 24 is a diagram showing a state in which the subject vehicle has reached a reverse starting position.

When the driver moves the subject vehicle forward and to the right from the start position of FIG. 23, since the expected parking position moves on the display unit 8 as shown in FIG. 24, the driver stops the subject vehicle at a position or reverse starting position where the expected parking position correctly coincides with the target parking position. When the first determination means M1, and the second determination means M2, determine that the expected parking position has coincided with the target parking position, the buzzer 9 operates. The driver can therefore recognize that the subject vehicle has reached the correct reverse starting position not only by the display on the display unit 8 but also by the sound of the buzzer 9.

Figure 25:
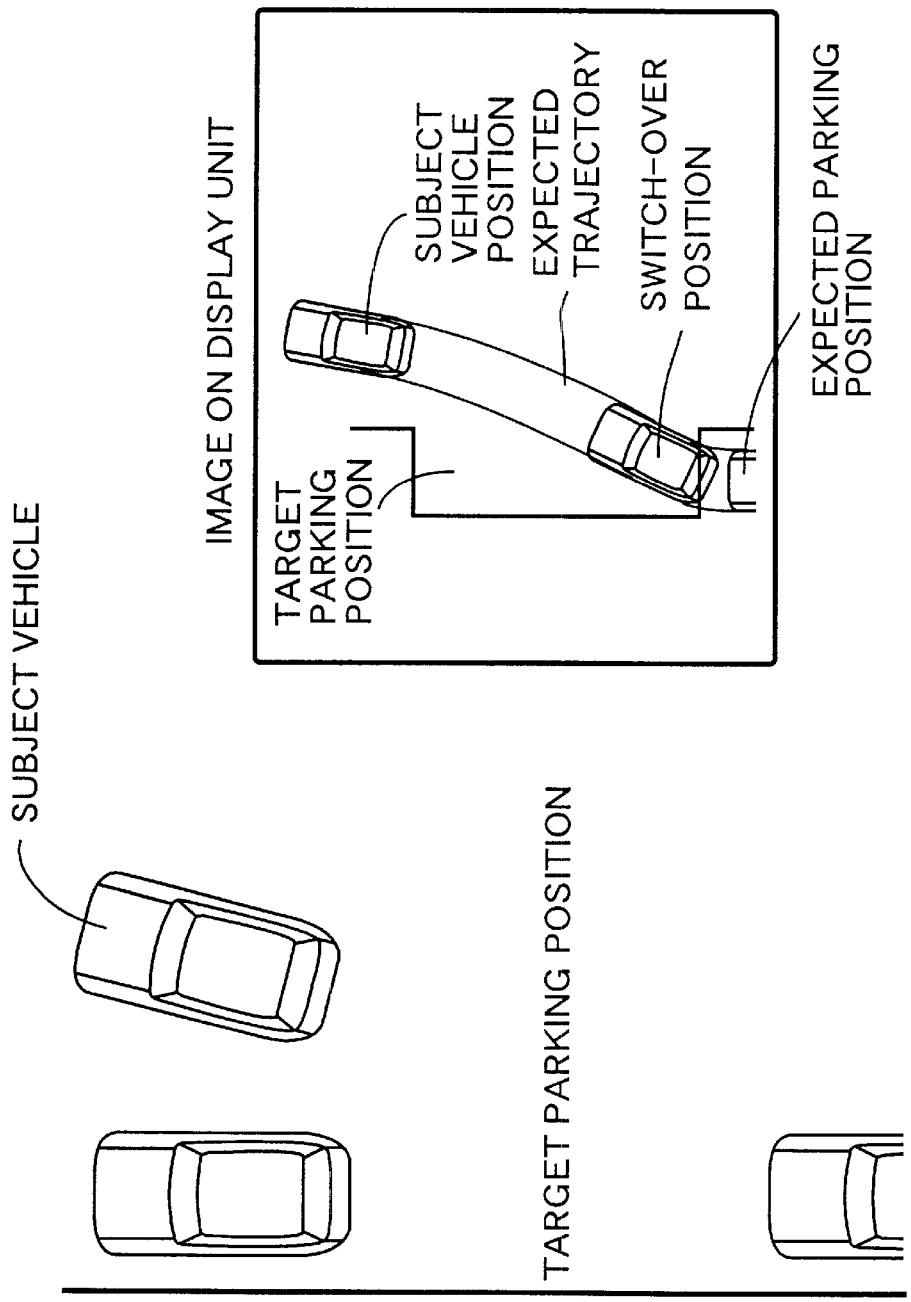
FIG. 25 is a diagram showing a state in which the subject vehicle has selected reverse range at the reverse starting position.
Figure 26:
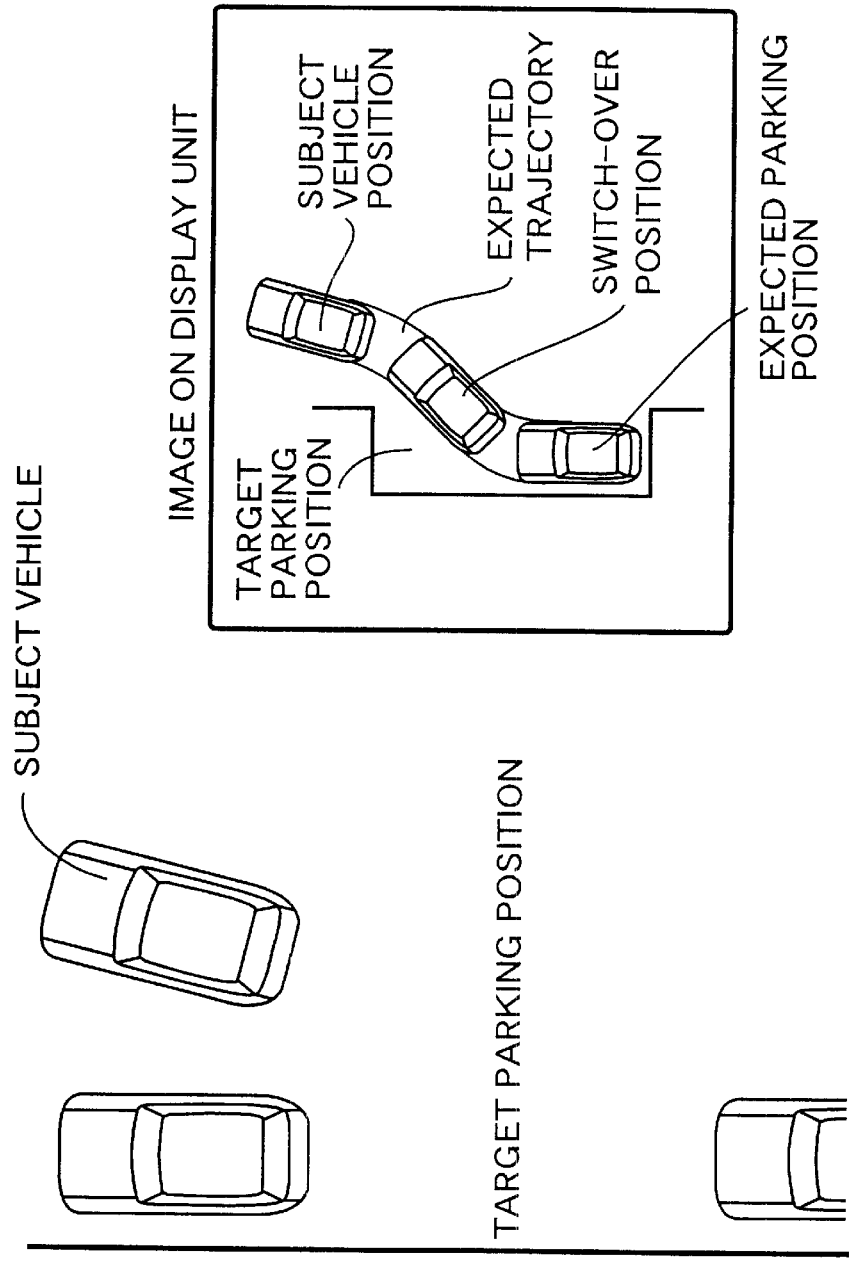
FIG. 26 is a diagram showing a state in which the subject vehicle has turned the steering wheel to the left at the reverse starting position.
Figure 27:
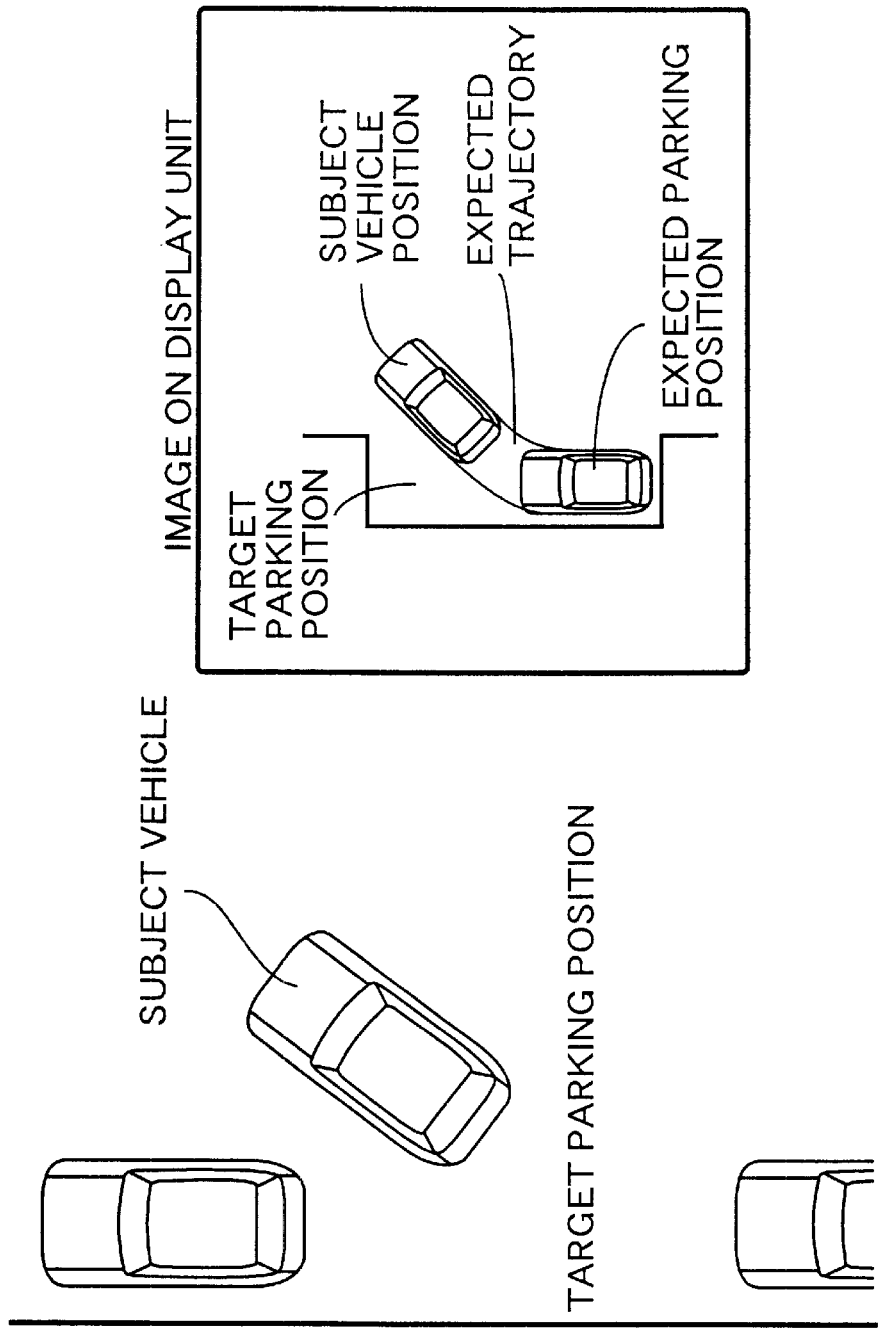
FIG. 27 is a diagram showing a state in which the subject vehicle has reached a switch over position.

When the driver operates the select lever to select reverse range at the reverse starting position, as shown in FIG. 25, the switch-over position that has been displayed on the display unit 8 as a switch-over position in the case where the subject vehicle reverses with the left maximum steering angle is interchanged with a switch-over position that results when the subject vehicle reverses with the current actual steering angle. The expected parking position is, in this case, set at a position that results when the subject vehicle reverses from the new switch-over position with the maximum steering angle to the right. When the driver turns the steering wheel further to the left at the reverse starting position, as shown in FIG. 26, the switch-over position and the expected parking position move and the expected parking position finally coincides with the target parking position. By reversing the subject vehicle from the reverse starting position while maintaining this steering angle, the subject vehicle can be guided to the switch-over position, as shown in FIG. 27.

Figure 28:
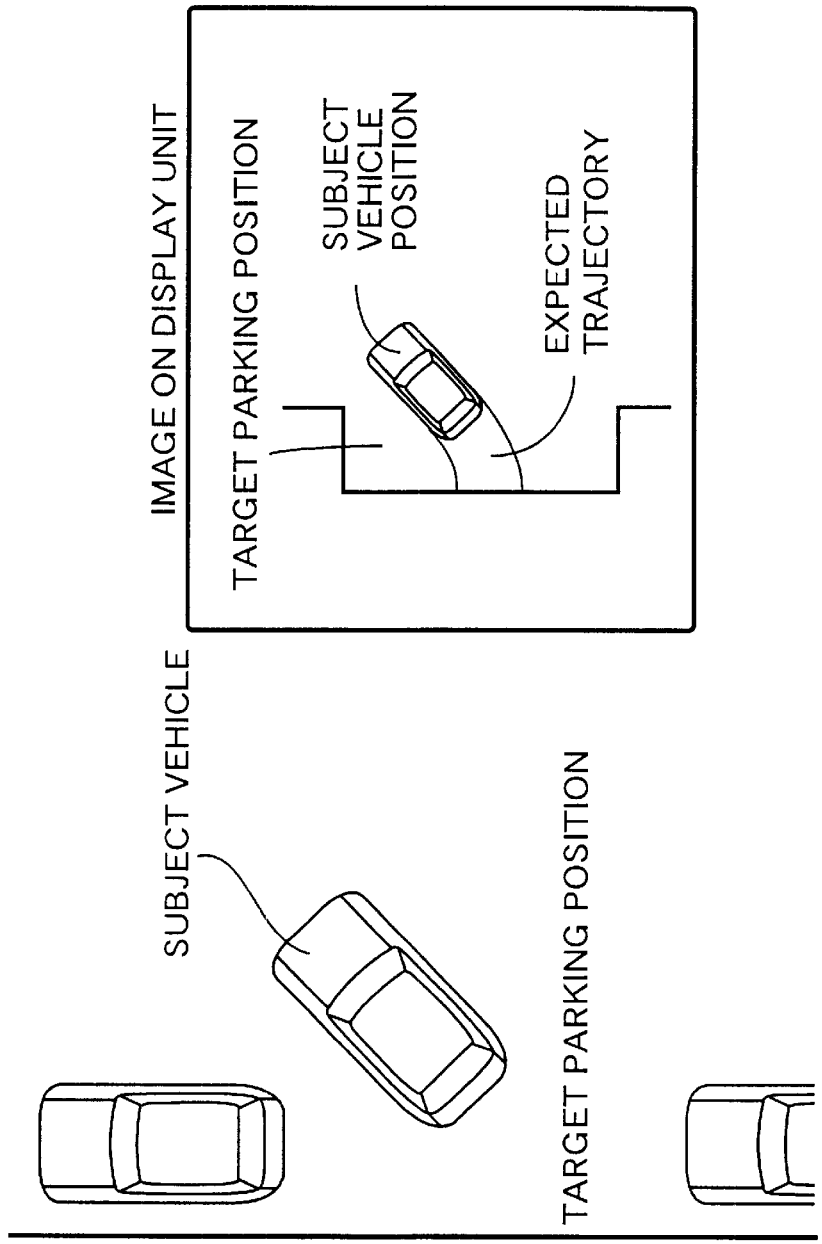
FIG. 28 is a diagram showing a state in which the display on a display unit has changed when the subject vehicle has reached the switch over position.
Figure 29:
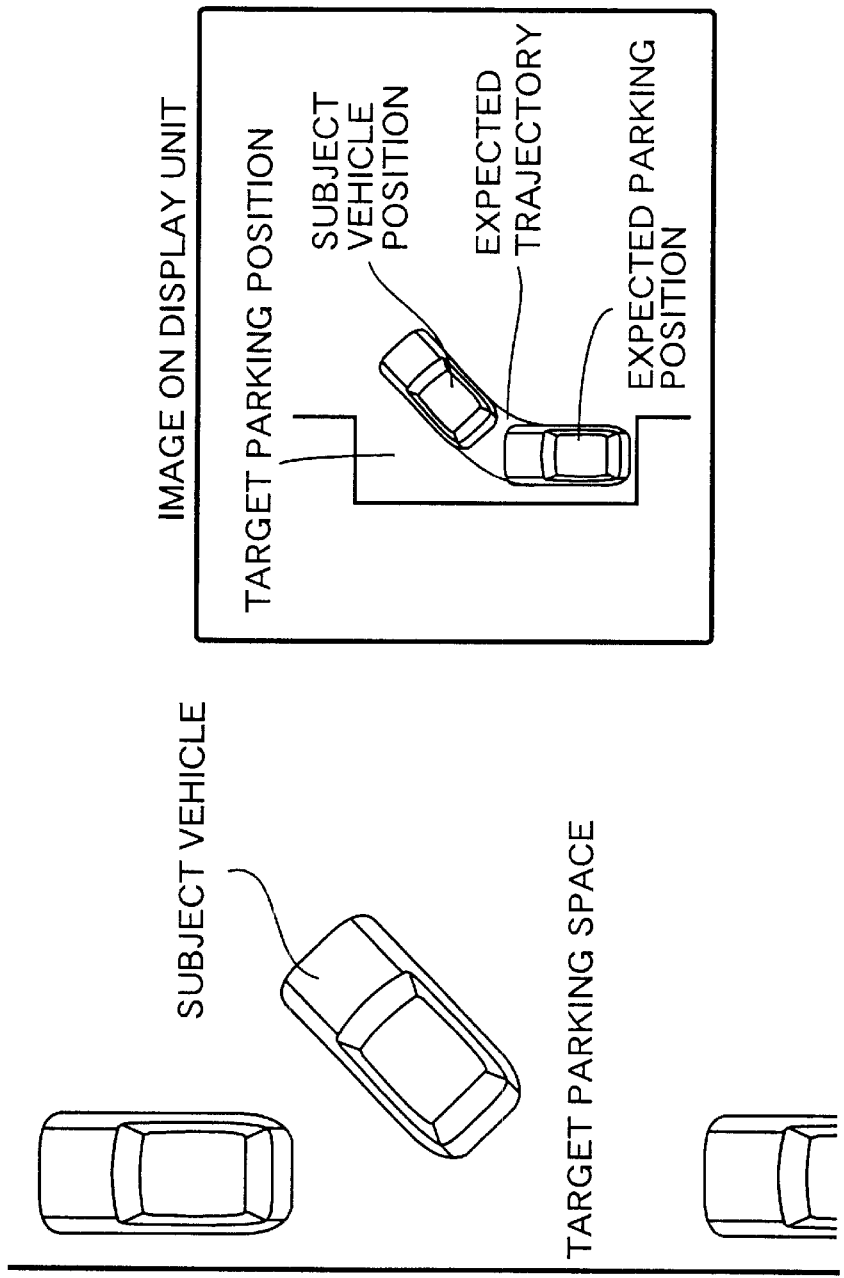
FIG. 29 is a diagram showing a state in which the steering wheel of the subject vehicle has been turned to the right at the switch over position.
Figure 30:
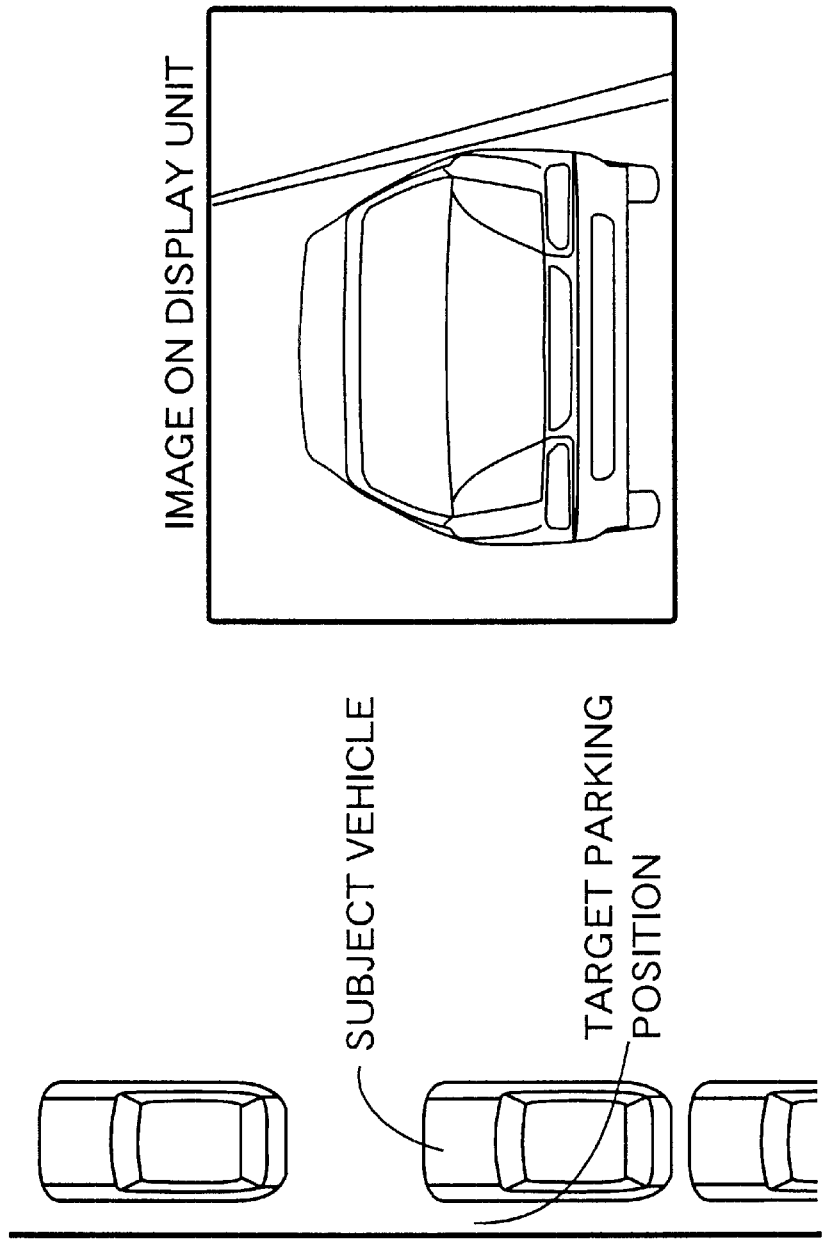
FIG. 30 is a diagram showing a state in which the subject vehicle has reached an expected parking position.

When the second determination means M2, and the third determination means M3, determine that the vehicle has reached the switch-over position, the buzzer 9 operates. Also, when the driver stops the vehicle at the switch-over position, the display for the case where the vehicle reverses with the maximum steering angle to the right is changed to a display for the case where the subject vehicle reverses with the current actual steering angle, as shown in FIG. 28. Subsequently, when the driver turns the steering wheel further rightward at the switch-over position, the expected parking position, on the display unit 8 changes and finally coincides with the target parking position, as shown in FIG. 29. When the vehicle is reversed in this state while maintaining the steering angle, the vehicle is guided from the switch-over position to the expected parking position, i.e., the target parking position, as shown in FIG. 30. When the vehicle starts reversing from the switch-over position, the image on the display unit 8 is changed to an image of the area behind the subject vehicle taken by the back monitor 7.

It is also possible to change the display on the display unit 8 to that of an image of the area behind the subject vehicle taken by the back monitor 7 while reversing the vehicle after the expected parking position has coincided with the target parking position in FIG. 26 or while reversing the vehicle after the vehicle has reached the switch-over position and the expected parking position has coincided with the target parking position as a result of a steering operation. In this way, even if the driver looks at the display unit 8 while in reverse, since the displayed image is of the area behind the vehicle that the vehicle is approaching, the driver can pay sufficient attention to safety and parking can be carried out easily.

The above-mentioned action is explained in detail with reference to the flow charts of FIGS. 31 and 32.

Figure 33:
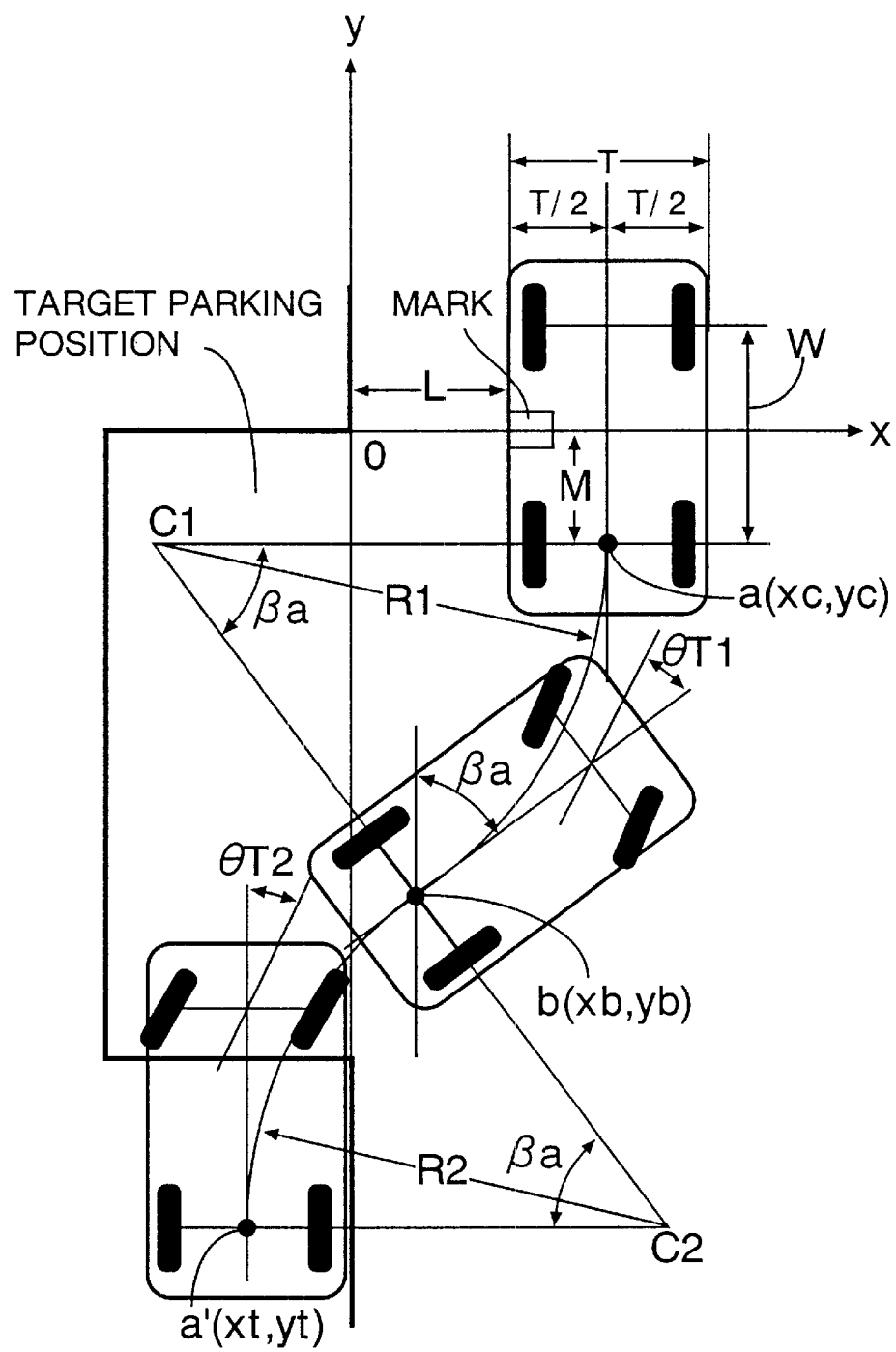
FIG. 33 is a diagram for explaining a method of calculating the subject vehicle position, the switch over position and the expected parking position.
Figure 34:
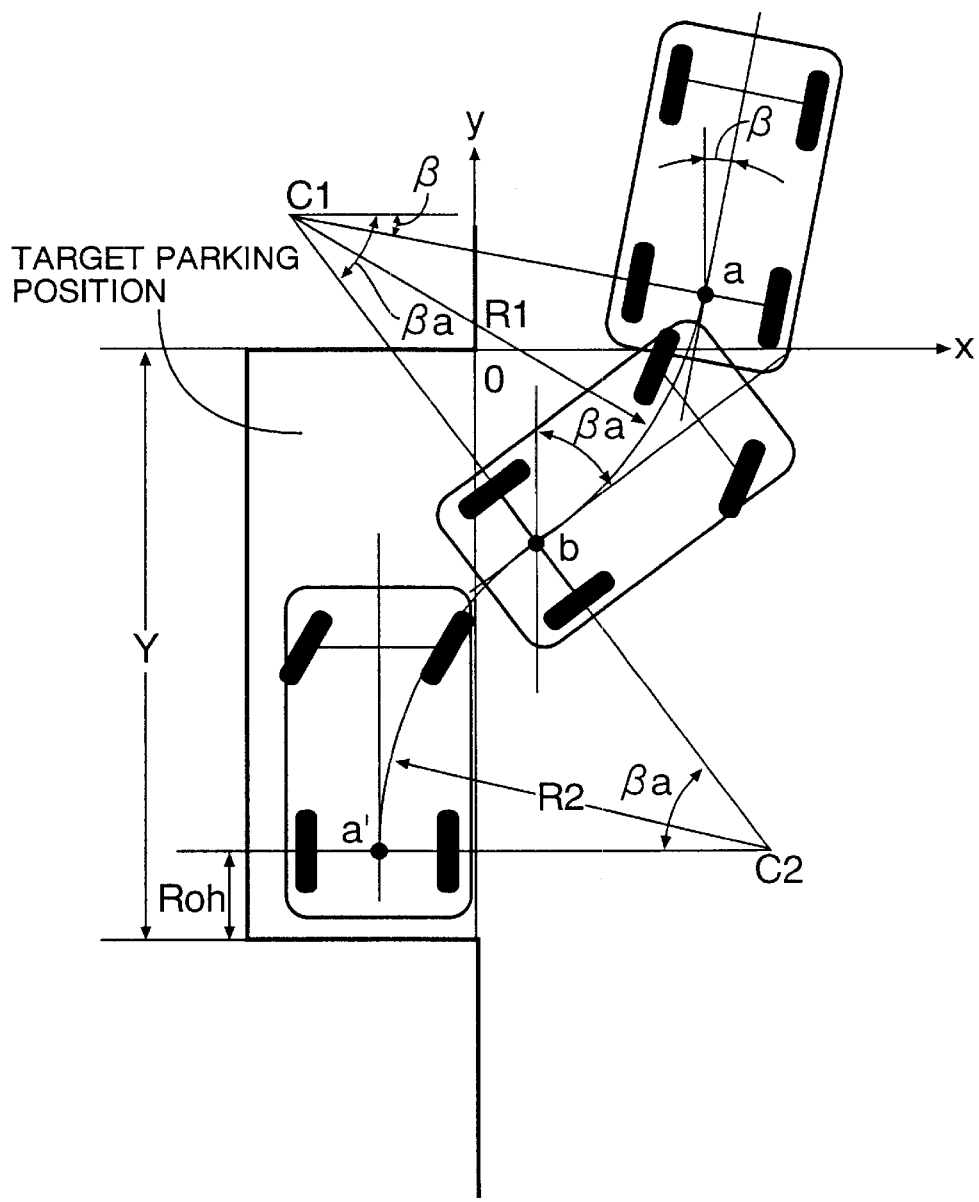
FIG. 34 is a diagram for explaining a method of calculating the switch over position.
Figure 35:
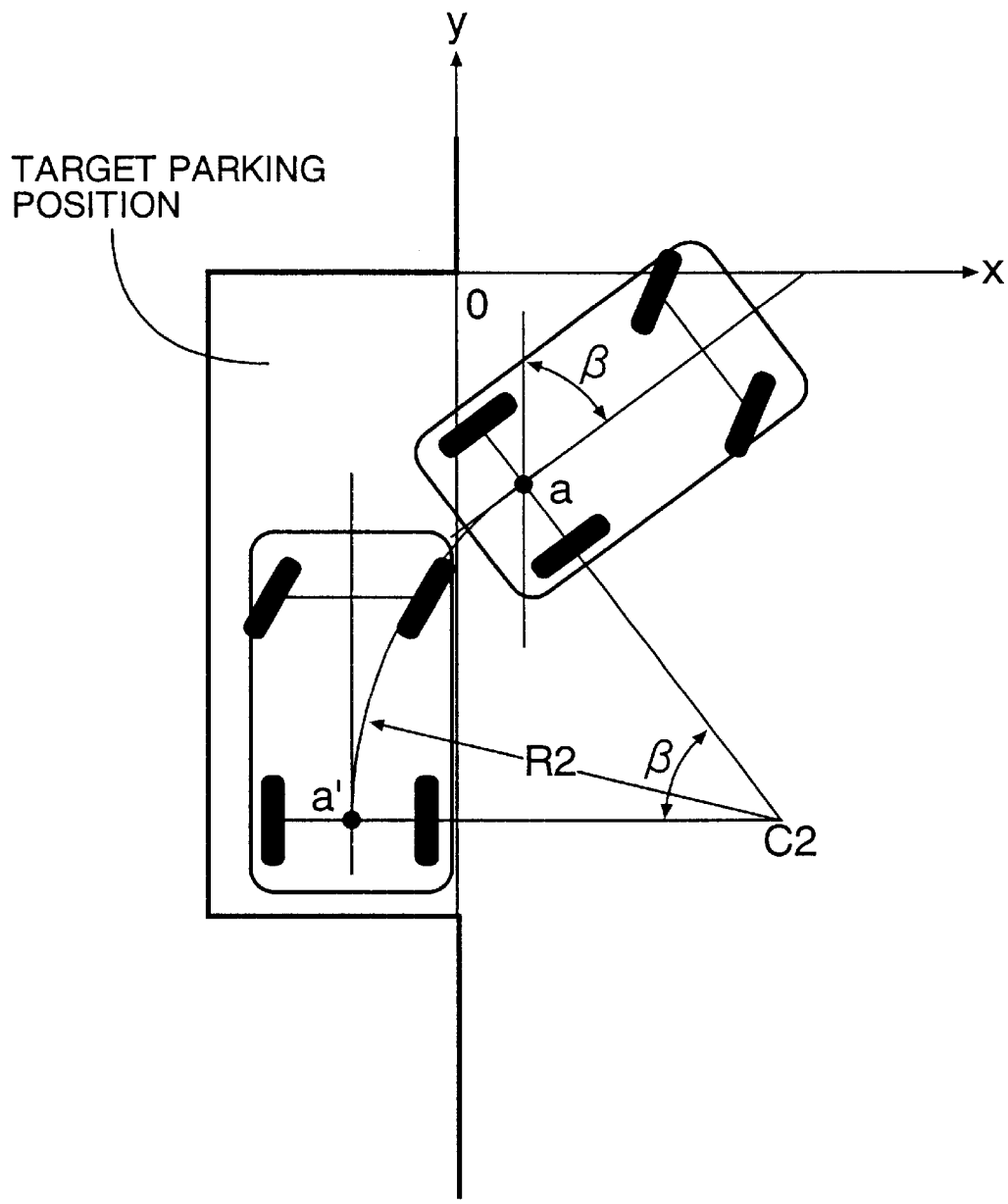
FIG. 35 is a diagram explaining a method of calculating the expected parking position.

When the operation switch 2 is turned ON, firstly in the initialization step S21, coordinate axes having their origin at the outside front corner of the target parking position, as shown in FIG. 33, are provided. Also, the coordinates (xc, yc) of the subject vehicle position 'a', the coordinates (xb, yb) of the switch-over position 'b', and the coordinates (xt, yt) of the expected parking position 'a''' are given. The expected parking position 'a''' is set at a position where the right side of the subject vehicle lies along the entrance (x=0) of the target parking position, as shown in FIG. 33.

The x coordinate xc of the subject vehicle position 'a' is given by:

$$xc = L + T/2$$

where L is the distance between the entrance of the target parking position and the left side of the subject vehicle and T is the width of the vehicle. The y coordinate yc of the subject vehicle position 'a' is given by:

$$yc = -M$$

where M is the distance between the mark and the rear wheel axle, since the right front edge of the target parking position and the mark are both on the x axis.

The x coordinate xb of the switch-over position 'b' is given by the equation below, where R1 is the turning radius and βa is the inclination of the vehicle at the switch-over position 'b':

$$xb = xc - R1 + R1\cos\beta a$$
$$= xc - R1(1 - \cos\beta a).$$

The y coordinate yb of the switch-over position 'b' is given by:

$$yb = yc - R1 \sin \beta a.$$

The turning radius R1 is given by R1=W/tan θT1, where θT1 is the front wheel turning angle when the steering wheel is turned to the maximum steering angle to the left. The vehicle inclination, βa is explained later. The x coordinate xt of the expected parking position 'a''' is given by:

$$xt = -T/2,$$

and the y coordinate yt of the expected parking position 'a''' is given by:

$$yt = yb - R2 \sin \beta a.$$

The turning radius R2 is given by R2=W/tan θT2, where θT2 is the front wheel turning angle when the steering wheel is turned to the maximum steering angle to the right.

Next, a method of calculating the vehicle inclination βa at the switch-over position is explained. From the geometric relationship in FIG. 33, the sum of the distance R1(1−cos βa) on the x axis from the subject vehicle position 'a' to the switch-over position 'b' and the distance R2(1−cos βa) on the x axis from the switch-over position 'b' to the expected parking position 'a''' equals the distance xc+T/2 on the x axis between the subject vehicle position 'a' and the expected parking position 'a'''. The equation below is therefore satisfied.

$$R1(1-\cos \beta a) + R2(1-\cos \beta a) = xc + T/2.$$

This equation can be rearranged as follows:

$$\beta a = \cos^{-1}\{(1 - xc - T/2)/(R1 + R2)\}.$$

In step S21, the vehicle inclination β is set at 0, and a flag FLAG for showing that the vehicle has reached the switch-over position 'b' is set at 0.

The subject vehicle position 'a', the switch-over position 'b', and the expected parking position 'a''' thus calculated are displayed on the display unit 8 in step S22. When there is an input from the travel distance sensor 3 in the next step S23, the vehicle speed V is calculated in step S24. If the vehicle speed V exceeds a vehicle speed limit VL, e.g. 10 km/hz, in step S25, since there is a possibility that the vehicle might not follow the target trajectory, the parking assistance is ended. If the vehicle speed V is at the vehicle speed limit VL or below in the above-mentioned step S25, the steering angle θ is detected in step S26, if the reverse switch 6 is OFF in step S27, the routine moves on to step S28, and if the reverse switch 6 is ON, the routine moves on to step S29. The methods of calculating the subject vehicle position 'a' and the expected parking position 'a'' in steps S28 and S29 are the same as those in the above-mentioned third embodiment and are therefore not explained here. A method of calculating the switch-over position 'b' is now explained by reference to FIG. 34.

The method of calculating the switch-over position 'b' is basically the same as the method of calculating the switch-over position 'b' employed in the initialization, but is different therefrom in terms of the subject vehicle being inclined by β at the subject vehicle position 'a', i.e., the reverse starting position 'a'. As is clear from FIG. 34, the x coordinate xb of the switch-over position 'b' is given by:

$$xb = xc - R1\cos\beta + R1\cos\beta a$$
$$= xc - R1(\cos\beta - \cos\beta a).$$

The y coordinate of the switch-over position 'b' is given by:

$$yb = yc - R1\sin\beta a + R1\sin\beta$$
$$= yc - R1(\sin\beta a - \sin\beta).$$

When β is 0, the same result as that obtained for the switch-over position 'b' in the initialization is obtained.

Next, a method of calculating the vehicle inclination βa at the switch-over position 'b' is explained. From the same viewpoint as above, the sum of the distance R1(cos β−cos βa) on the x axis from the subject vehicle position 'a' to the switch-over position 'b' and the distance R2(1−cos βa) on the x axis from the switch-over position 'b' to the expected parking position 'a'' equals the distance xc+T/2 on the x axis between the subject vehicle position 'a' and the expected parking position 'a''. The equation below is therefore satisfied.

$$R1(\cos\beta - \cos\beta a) + R2(1 - \cos\beta a) = xc + T/2.$$

This equation can be rearranged as follows:

$$\beta a = \cos^{-1}\{(R1\cos\beta + R2)/(R1 + R2) - (xc + T/2)/(R1 + R2)\}.$$

In step S28, the turning radii R1 and R2 are turning radii with the steering wheel turned at its maximum steering angle while traveling forward. In step S29 the turning radius R1 is the turning radius with the actual steering angle detected in step S26 and the turning radius R2 is the turning radius with the steering wheel turned at its maximum steering angle while reversing.

Next, in step S30, the subject vehicle position 'a', the switch-over position 'b', and the expected parking position 'a'' calculated in the above-mentioned step S28 for forward travel are displayed on the display unit 8. The subject vehicle position 'a', the switch-over position 'b' and the expected parking position 'a'' calculated in the above-mentioned step S29 for reversing are displayed on the display unit 8 in step S30 if the steering angle θ in the left direction is at a predetermined value θs, e.g. 360° or less, in step S31. If the steering angle θ in the left direction exceeds the predetermined value θs in the above-mentioned step S31, it is determined that reversing from the reverse starting position 'a' to the switch-over position 'b' has started, and the routine moves on to the flow chart in FIG. 32.

When the subject vehicle position 'a', the switch-over position 'b' and the expected parking position 'a'' are displayed on the display unit 8 in the above-mentioned step S30, it is determined in step S32 whether the expected parking position 'a'' has reached the target parking position. The criterion is whether the rear end of the vehicle at the expected parking position 'a'' has moved beyond the rear end of the target parking position. That is, in FIG. 34, since the y coordinate of the rear end of the vehicle is given by yt−Roh where Roh is a distance between the rear wheel axle and the rear end of the vehicle, when yt−Roh>−Y, i.e., if yt>−Y+Roh where the y coordinate of the rear end of the target parking position is denoted by −Y, it is determined that the expected parking position 'a'' has reached the target parking position.

The y coordinate −Y of the rear end of the target parking position can be obtained as follows. In other words, the distance Y is the distance detected by the travel distance sensor 3 from a position, as shown by the dotted line, where the mark of the subject vehicle has reached the rear end of the target parking position to a position, i.e., start position, where the mark of the subject vehicle has reached the front end of the target parking position in FIG. 23.

When the expected parking position 'a'' has reached the target parking position in the above-mentioned step S32, the y coordinate yt of the expected parking position 'a'' is compared with a predetermined limit value yL in step S33. If yt>yL is satisfied, it is determined that the subject vehicle has passed beyond an appropriate reverse starting position and the parking assistance is ended. If yt>yL is not satisfied and the subject vehicle has not passed beyond an appropriate reverse starting position, the buzzer 9 operates in step S34 in order to stop the vehicle and the routine moves on to step S35.

When there is no input from the travel distance sensor 3 in step S23 due to the vehicle stopping at the reverse starting position, if the reverse switch 6 is turned ON in step S36 and reverse range is thus selected, the steering angle sensor 5 detects the steering angle θ in step S37. Subsequently, in step S38 the switch-over position 'b' and the expected parking position 'a'' corresponding to the steering angle θ so detected are calculated, and the above-mentioned switch-over position 'b' and the expected parking position 'a'' are displayed on the display unit 8 in step S39.

Figure 31:
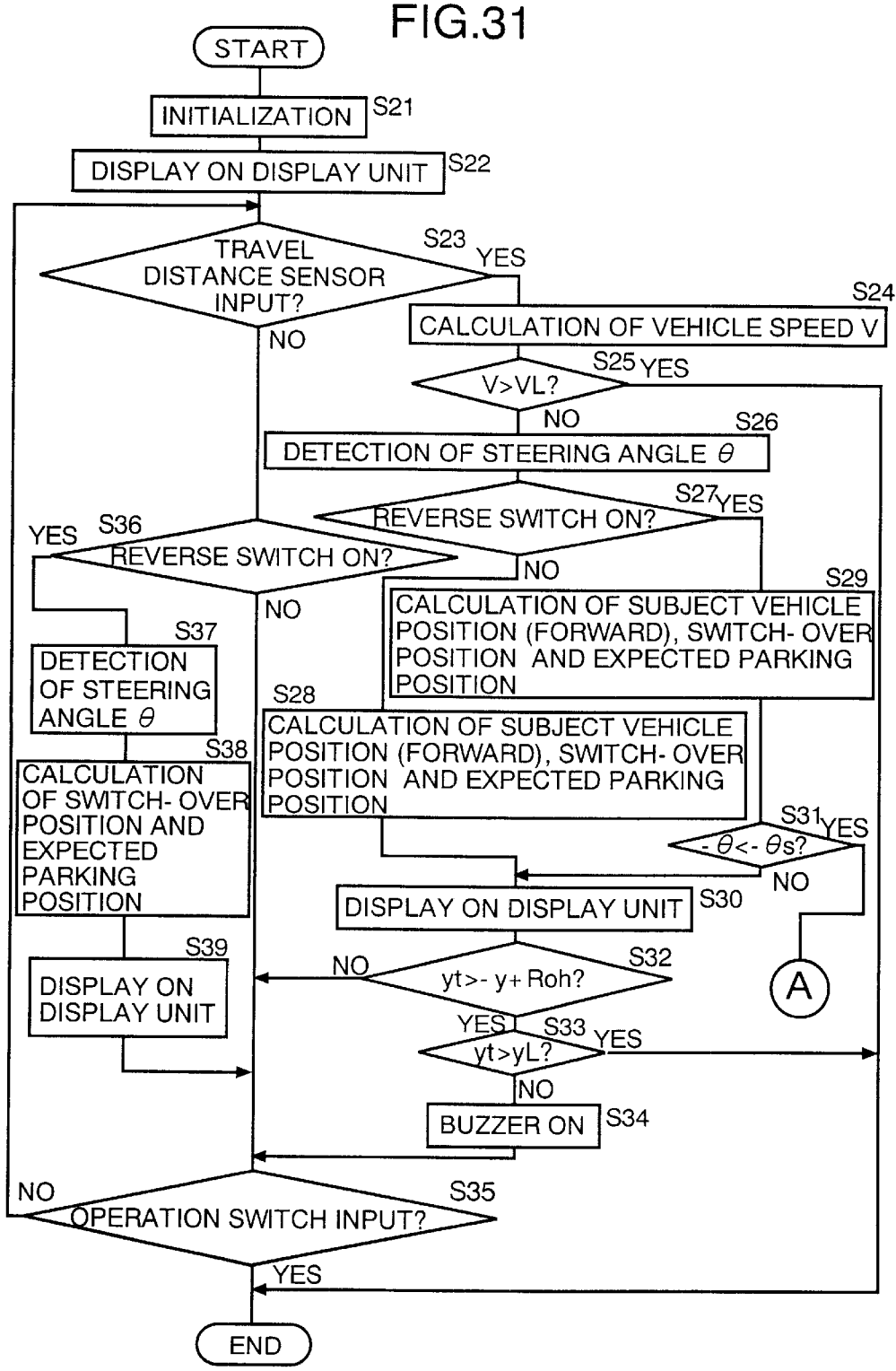
FIG. 31 is a first section of a flow chart.
Figure 32:
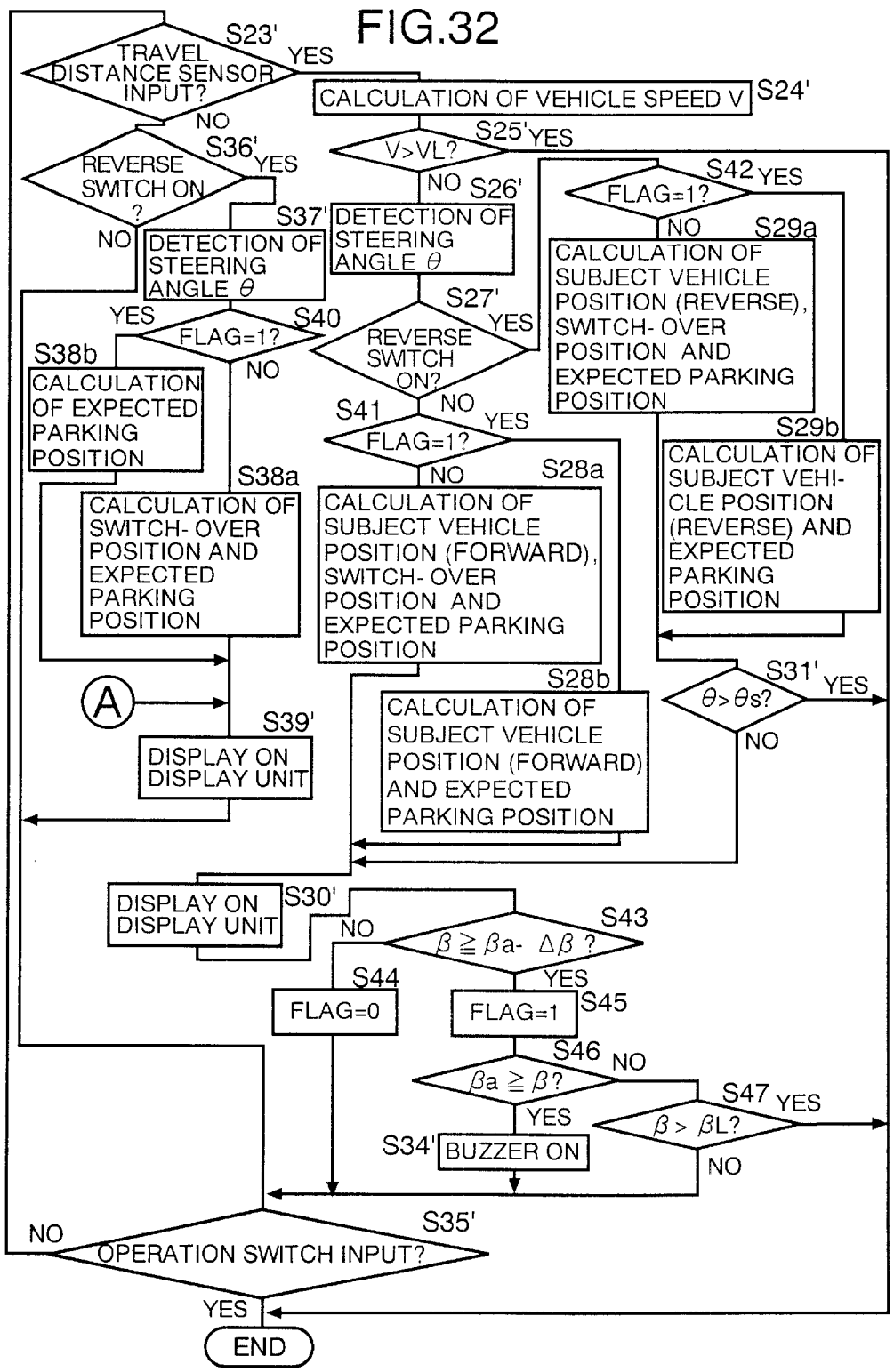
FIG. 32 is a second section of the flow chart.

The flow chart of FIG. 31 explained above illustrates the action between the time when the subject vehicle reaches the reverse starting position from the start position and stops and the time when the steering wheel is turned left to a large extent so as to start reversing. On the other hand, the flow chart of FIG. 32 following the flow chart of FIG. 31 illustrates the action between the time when the steering wheel is turned right to a large extent at the switch-over position so as to make the expected parking position coincide with the target parking position after the subject vehicle has moved from the reverse starting position to the switch-over position and the time when the parking assistance is ended. The contents of the steps with a number containing "'" in the flow chart of FIG. 32 are substantially the same as those of the steps having the corresponding number in the flow chart of FIG. 31, and the explanation therefore centers on the contents of the other steps.

FLAG in steps S40, S41 and S42 is set at 0 until the subject vehicle reaches the switch-over position as described above and is set at 1 when the subject vehicle reaches the switch-over position. Step S40 corresponds to a case where the subject vehicle has stopped and the reverse switch 6 is ON. The switch-over position and the expected parking position are calculated in step S38a while FLAG is 0 and the subject vehicle has not reached the switch-over position. After FLAG becomes 1 and the subject vehicle has reached the switch-over position, the expected parking position alone is calculated in step S38b. Step S41 corresponds to a case where the subject vehicle is traveling forward. The switch-over position and the expected parking position are calculated in step S28a while FLAG is 0 and the subject vehicle has not reached the switch-over position. After FLAG becomes 1 and the subject vehicle has reached the switch-over position, the expected parking position alone is calculated in step S28b. Step S42 corresponds to a case where the subject vehicle is reversing. The switch-over position and the expected parking position are calculated in step S29a while FLAG is 0 and the subject vehicle has not reached the switch-over position. After FLAG becomes 1 and the subject vehicle has reached the switch-over position, the expected parking position alone is calculated in step S29b.

It is determined in step S43 whether or not the subject vehicle has reached the switch-over position. This determination is carried out by comparing the subject vehicle inclination $\beta$ with the pre-calculated inclination. $\beta a$ at the switch-over position. If $\beta$ exceeds $\beta a$ at the switch-over position, since the subject vehicle cannot be guided to the target parking position even by subsequently turning the steering wheel rightward to the maximum steering angle, it is necessary to determine whether or not the subject vehicle has reached the switch-over position before $\beta$ exceeds $\beta a$. It is therefore determined that when $\beta a \geq \beta \geq \beta a - \Delta \beta$ is satisfied, the subject vehicle has reached the switch-over position. As described above, when the change in angle when the vehicle moves by a distance corresponding to one count of the pulse signal with a maximum steering angle is expressed as a, the above-mentioned $\Delta \beta$ is a change in angle slightly larger than ax. If the determination condition is set as $\beta a \geq \beta \geq \beta a - \Delta \beta$, the value of $\beta$ when a certain pulse signal is output can therefore be guaranteed to always fall between $\beta a$ and $\beta a - \Delta \beta$, and it can be determined accurately whether or not the subject vehicle has reached the switch-over position.

First, if $\beta \geq \beta a - \Delta \beta$ is not satisfied in step S43, it is thus determined that the subject vehicle has not reached the switch-over position and FLAG is set at 0 in step S44. If $\beta \geq \beta a - \Delta \beta$ is satisfied, it is determined that the subject vehicle has reached the switch-over position and FLAG is set at 1 in step S45. After FLAG is set at 1 in the above-mentioned step S45, if $\beta a \geq \beta$ is satisfied in step S46, the buzzer 9 operates in step S34' to notify the driver that the subject vehicle has reached the switch-over position. If the subject vehicle has passed beyond the switch-over position and the inclination $\beta$ exceeds a limit value $\beta L$ in step S47, since it is impossible to guide the subject vehicle to the target parking position, the parking assistance is ended.

When the subject vehicle reaches the switch-over position and stops, the driver turns the steering wheel to the right to a large extent to make the expected parking position coincide with the target parking position and then starts reversing towards the target parking position. As a result, it is detected in step S31' that the steering angle $\theta$ has exceeded a predetermined steering angle $\theta s$, e.g. 360°, and the parking assistance is therefore ended at this point. The target parking position, the subject vehicle position, the expected trajectory and the expected parking position that have been displayed on the display unit 8 are replaced with an image of the area behind the subject vehicle taken by the back monitor 7.

Embodiments of the present invention are explained above, but the present invention can be modified in a variety of ways without departing from the sprit and scope of the present invention defined in claims.

For example, in the third and fourth embodiments, with regard to the steering angle $\theta$, if the maximum steering angle is replaced by a steering angle that is slightly smaller, e.g. 30°, than the maximum steering angle, when the driver adjusts the expected parking position by operating the steering wheel, the driver can rotate the steering wheel in the direction that increases the turning angle, and thus the adjustment becomes easy.

In the embodiments of the present invention, the subject vehicle position, target position, expected parking position and expected trajectory are displayed on the display unit 8, but the expected trajectory may be omitted. In the embodiments, the subject vehicle position is represented by a picture of a vehicle, but when displaying the expected trajectory, since the end of the expected trajectory indicates the subject vehicle position, the display of the subject vehicle position may be omitted.

What is claimed is:

1. A parking aid system comprising:
    a display unit to visually display to a driver a target parking position, a subject vehicle position, and an expected parking position where the subject vehicle travels with a predetermined steering angle; and
    an operation switch for selecting a parking aid mode,
    wherein the display unit displays when a parking aid mode is selected by the operation switch, the target parking position, the subject vehicle position and the expected parking position, as well as a change in at least one of the subject vehicle position and the expected parking position relative to the target parking position according to a change in at least one of a movement of the subject vehicle and a steering angle.

2. The parking aid system according to claim 1, wherein the display unit further visually displays to the driver an expected trajectory when the subject vehicle travels with the predetermined steering angle as well as a change in the expected trajectory relative to the target parking position according to the change in at least one of the movement of the subject vehicle and the steering angle.

3. The parking aid system according to claim 1, wherein the predetermined steering angle is a maximum steering angle to either a right or a left direction of the subject vehicle.

4. The parking aid system according to claim 1, further comprising first determination means for determining an occurrence of any event of the expected parking position coinciding with the target parking position, a predetermined time having passed in a coincident state, and a time immediately before coincidence of positions, based on the change in at least one of the movement of the subject vehicle and the steering angle.

5. The parking aid system according to claim 4, further comprising notifying means for notifying the driver when the first determination means has determined the occurrence of any of the events of the expected parking position coinciding with the target parking position, the predetermined time having passed in the coincident state, and the time immediately before the coincidence of positions.

6. The parking aid system according to claim 5, wherein the notifying means notifies the driver using sound.

7. The parking aid system according to claim 5, wherein the notifying means notifies the driver by changing a displayed form of at least one of the target parking position, the subject vehicle position, the expected trajectory, and the expected parking position displayed on the display unit.

8. The parking aid system according to claim 7, wherein the displayed form is a color or line.

9. The parking aid system according to claim 5, wherein the notifying means notifies the driver by displaying, on the display unit, a character string indicating the occurrence of any of the events of the expected parking position coinciding with the target parking position, the predetermined time having passed in the coincident state, and the time immediately before the coincidence of positions.

10. The parking aid system according to claim 5, further comprising a back monitor to take an image of an area behind the subject vehicle, the notifying means notifying the driver by displaying the image taken by the back monitor on the display unit.

11. The parking aid system according to claim 5, wherein notification by the notifying means is carried out for a predetermined time.

12. The parking aid system according to claim 1, further comprising a mark used when stopping the subject vehicle so that the target parking position and the subject vehicle position have a predetermined positional relationship when selecting the parking aid mode with the operation switch.

13. The parking aid system according to claim 1, further comprising first cancellation means for canceling the parking aid mode when a difference between the target parking position and the expected parking position exceeds a predetermined value.

14. The parking aid system according to claim 1, further comprising second determination means for determining whether the subject vehicle position coincides with a predetermined position on a trajectory to the target parking position that an operational state of the subject vehicle is changed.

15. The parking aid system according to claim 14, further comprising notifying means for notifying the driver when the second determination means determines an occurrence of any event of the subject vehicle position coinciding with the predetermined position, a predetermined time having passed in a coincident state, and a time immediately before coincidence of positions.

16. The parking aid system according to claim 15, wherein the notifying means notifies the driver using sound.

17. The parking aid system according to claim 15, wherein the notifying means notifies the driver by changing the displayed form of at least one of the target parking position, the subject vehicle position, an expected trajectory, and the expected parking position displayed on the display unit.

18. The parking aid system according to claim 17, wherein the displayed form is a color or line.

19. The parking aid system according to claim 15, wherein the notifying means notifies the driver by displaying on the display unit a character string indicating the occurrence of any of the events of the subject vehicle position coinciding with the predetermined position, the predetermined time having passed in the coincident state, and a time immediately before the coincidence of positions.

20. The parking aid system according to claim 15, further comprising a back monitor that images an area behind the subject vehicle, the notifying means notifying the driver by displaying an image taken by the back monitor on the display unit.

21. The parking aid system according to claim 15, wherein notification by the notifying means is carried out for a predetermined time.

22. The parking aid system according to claim 14, wherein the change in operational state of the subject vehicle is a switch-over between forward and backward travel.

23. The parking aid system according to claim 14, wherein the change in operational state of the subject vehicle is a steering operation in an opposite direction.

24. The parking aid system according to claim 1, wherein the display unit displays an expected trajectory according to the predetermined steering angle before a second determination means determines an occurrence of any event of the subject vehicle position coinciding with a predetermined position, a predetermined time having passed in a coincident state, and a time immediately before the coincidence of positions, and displays an expected trajectory according to an actual steering angle after the determination.

25. The parking aid system according to claim 1, further comprising third determination means for determining that the subject vehicle position coincides with the target parking position.

26. The parking aid system according to claim 25, further comprising a back monitor that takes an image in a direction in which the subject vehicle is being parked, the image taken by the back monitor is displayed on the display unit when the third determination means determines that the expected parking position coincides with the target parking position.

27. The parking aid system according to claim 1, further comprising reverse determination means for determining that the subject vehicle is in a reverse mode, the display on the display unit being changed when the reverse determination means determines that the subject vehicle is in the reverse mode.

28. The parking aid system according to claim 27, further comprising a back monitor that takes an image of the area behind the subject vehicle, the image taken by the back monitor being displayed on the display unit when the reverse determination means determines that the subject vehicle is in a reverse mode.

29. The parking aid system according to claim 1, further comprising second cancellation means for canceling the parking aid mode when a speed of travel of the subject vehicle reaches or exceeds a predetermined value.

* * * * *